US006574179B2

United States Patent
Kaneko et al.

(10) Patent No.: US 6,574,179 B2
(45) Date of Patent: Jun. 3, 2003

(54) DISK ADAPTER CARRIED AWAY FROM A MOUNTED DISK

(75) Inventors: Takayuki Kaneko, Kanagawa (JP); Harutoshi Yoshimura, Saitama (JP); Akiomi Suzuki, Tokyo (JP); Shigeru Saegusa, Tokyo (JP); Masako Sudo, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/128,261

(22) Filed: Apr. 24, 2002

(65) Prior Publication Data

US 2002/0114255 A1 Aug. 22, 2002

Related U.S. Application Data

(62) Division of application No. 09/668,332, filed on Sep. 22, 2000.

(30) Foreign Application Priority Data

Sep. 29, 1999 (JP) .............................. 11-277448

(51) Int. Cl.[7] .............................................. G11B 17/03
(52) U.S. Cl. ...................................................... 369/77.1
(58) Field of Search .............................. 369/77.1, 289, 369/75.2, 75.1; 360/99.02, 99.06; 206/308.1

(56) References Cited

U.S. PATENT DOCUMENTS

| 5,844,874 | A | * | 12/1998 | Saito et al. | 369/75.1 |
| 6,052,352 | A | * | 4/2000 | Liou | 369/75.1 |
| 6,073,762 | A | * | 6/2000 | Hayakawa | 206/308.1 |
| 6,122,240 | A | * | 9/2000 | Kim | 369/77.1 |
| 6,141,310 | A | * | 10/2000 | Tanaka et al. | 369/75.2 |

FOREIGN PATENT DOCUMENTS

JP          07029280 A  *  1/1995

* cited by examiner

Primary Examiner—Hoa T. Nguyen
Assistant Examiner—Tianjie Chen
(74) Attorney, Agent, or Firm—Oblon, Spivak, McClelland, Maier & Neustadt, P.C.

(57) ABSTRACT

Disclosed is a disk adapter for receiving a disk-type recording medium on an inner circumference side thereof, comprising: a main plate portion having a substantially arcuate shape of a central angle of 180° or more; and a supporting portion formed on a half circumference side of the inner circumference of the main plate portion for supporting the disk-type recording medium mounted on the disk adapter. Consequently, mounting and removing operations of a disk-type recording medium onto and from the disk adapter are very simple.

10 Claims, 21 Drawing Sheets

DISK ADAPTER CARRIED AWAY FROM A MOUNTED DISK

This application is a Division of application Ser. No. 09/668,332 Filed on Sep. 22, 2000 pending.

BACKGROUND OF THE INVENTION

This invention relates to a disk adapter. More particularly, the present invention relates to a technical field of a disk adapter on which a disk-type recording medium onto and from which recording and reproduction of an information signal are performed is mounted.

Disk-type recording media, for example, compact disks (CD), are divided into a large diameter type having a diameter of 12 cm and a small diameter type having another diameter of 8 cm. In order to use a CD of the small diameter type, for example, on a disk playback apparatus, the CD of the small diameter type is sometimes mounted on and used together with a disk adapter.

A conventional disk adapter has such a structure that it has a substantially annular shape and a plurality of holding pieces are provided in an equidistantly spaced relationship from each other on an inner circumferential edge thereof such that the holding pieces may exert biasing force toward the center of the disk adapter. A disk-type recording medium is held by the biasing force toward the center side of the holding pieces which are engaged with an outer circumferential edge thereof.

In the conventional disk adapter, however, in order to mount a disk-type recording medium onto the disk adapter, operation is required to dispose the disk-type recording medium on the inner circumference side of the disk adapter and then engage the plurality of holding pieces provided in a spaced relationship from each other in a circumferential direction with the outer circumferential edge of the disk-type recording medium. On the other hand, in order to remove the disk-type recording medium from the disk adapter, operation is required to cancel the engagement of the outer circumferential edge of the disk-type recording medium with the plurality of holding pieces and remove the disk-type recording medium from the disk adapter. Therefore, mounting and removing operations of the disk-type recording medium onto and from the disk adapter take much time and are cumbersome.

SUMMARY OF THE INVENTION

Therefore, it is a subject of the disk adapter of the present invention to overcome the problem described above and make it possible for mounting and removing operations of a disk-type recording medium onto and from a disk adapter to be performed readily.

In carrying out and according to one aspect of the present invention, there is provided a disk adapter for receiving a disk-type recording medium on an inner circumference side thereof, comprising: a main plate portion having a substantially arcuate shape of a central angle of 180° or more; and a supporting portion formed on a half circumference side of the inner circumference of the main plate portion for supporting the disk-type recording medium mounted on the disk adapter.

According to another aspect of the present invention, there is provided a recording and/or playback apparatus, comprising: carrying means for carrying a disk adapter for receiving a disk-type recording medium on an inner circumference side thereof from an insertion position to a chucking position; mounting means for mounting the disk-type recording medium carried to the chucking position; and control means for controlling the carrying means so that, when the disk-type recording medium is mounted on the mounting means, the carrying means may carry the disk adapter to a position spaced away from the disk-type recording medium.

DETAILED DESCRIPTION OF THE PREFERRED EMBODIMENTS

In the following, an embodiment of the present invention is described with reference to the accompanying drawings.

It is to be noted that, in the embodiment described below, the present invention is applied to a disk playback apparatus.

The disk playback apparatus 1 includes a body section 2 and a speaker section not shown disposed adjacent the body section 2. The body section 2 includes required members and mechanisms provided in an outer housing 3.

Figure 1:
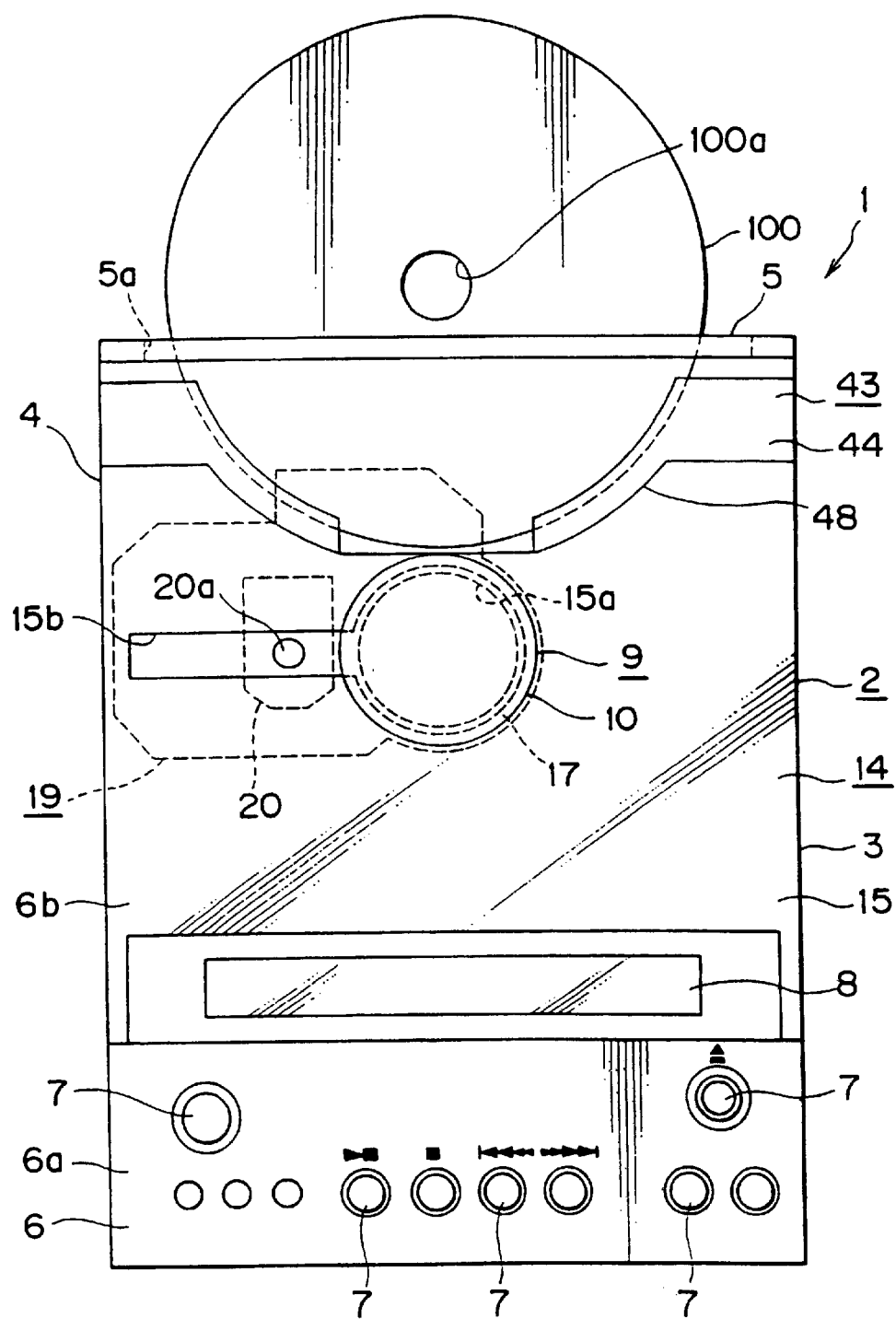
FIG. 1 shows an embodiment of the present invention together with FIGS. 2 to 24 and is a schematic front elevational view of a disk playback apparatus illustrating a state before a CD is inserted into an outer housing.
Figure 2:
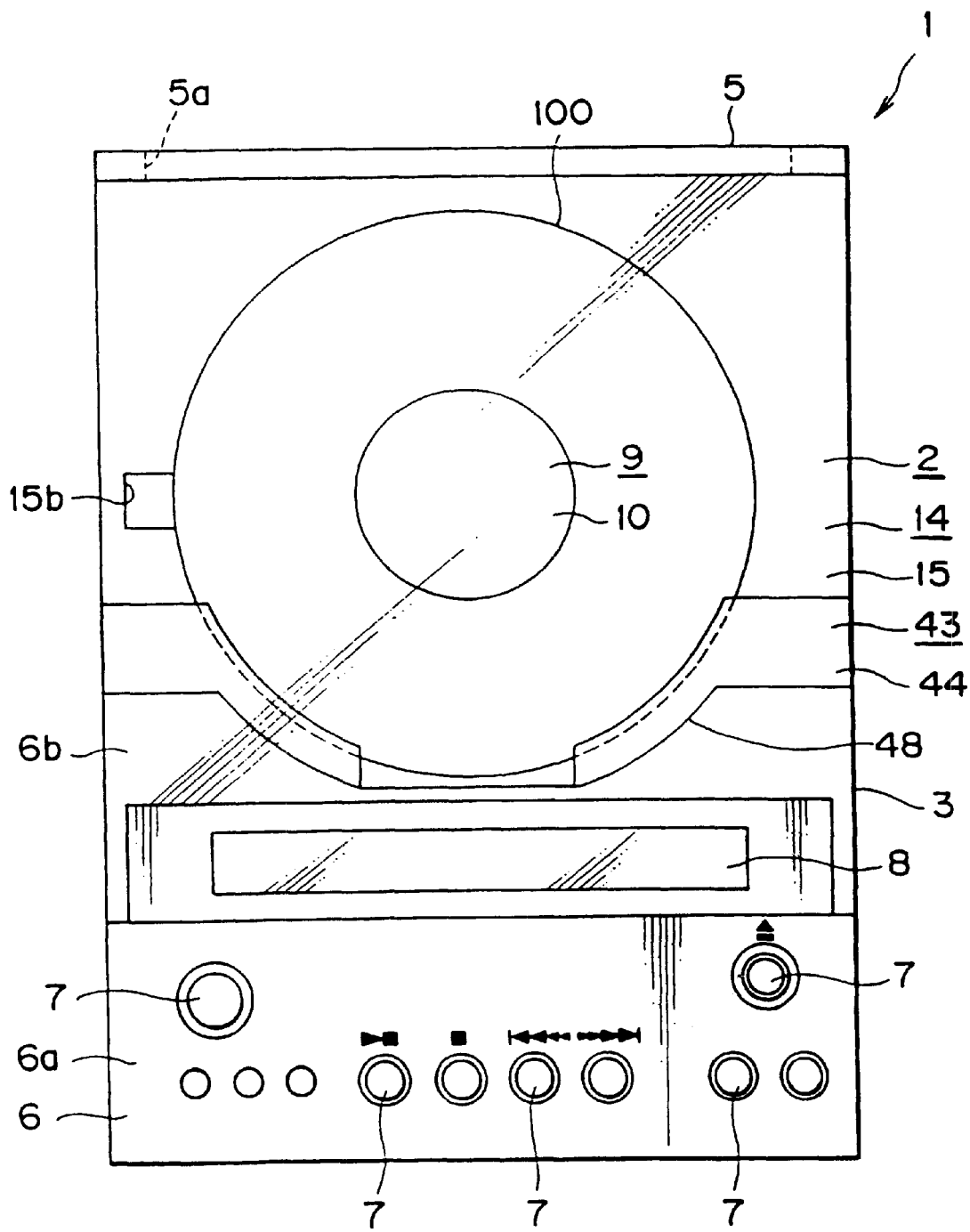
FIG. 2 is a schematic front elevational view of the disk playback apparatus illustrating a state wherein a CD is inserted in the outer housing.

The outer housing 3 includes a housing member 4 formed as a box which is open forwardly, a top panel 5 mounted at an upper end portion of the front of the housing member 4, and a front panel 6 mounted on a front face of the top panel 5 (refer to FIGS. 1 and 2). An insertion slot 5a elongated in the leftward and rightward directions is formed in the top panel 5.

The front panel 6 includes an operation panel section 6a positioned on the lower side and a transparent panel section 6b formed from a transparent material and mounted at an upper end portion of the operation panel section 6a (refer to FIGS. 1 and 2). A liquid crystal display section 8 on which operation buttons 7, 7, . . . for various operations performed by the user and various display images are displayed is disposed on the operation panel section 6a. A disk damper 9 is secured substantially at a central portion of the rear face of the transparent panel section 6b (refer to FIG. 1 and FIG. 14).

Figure 14:
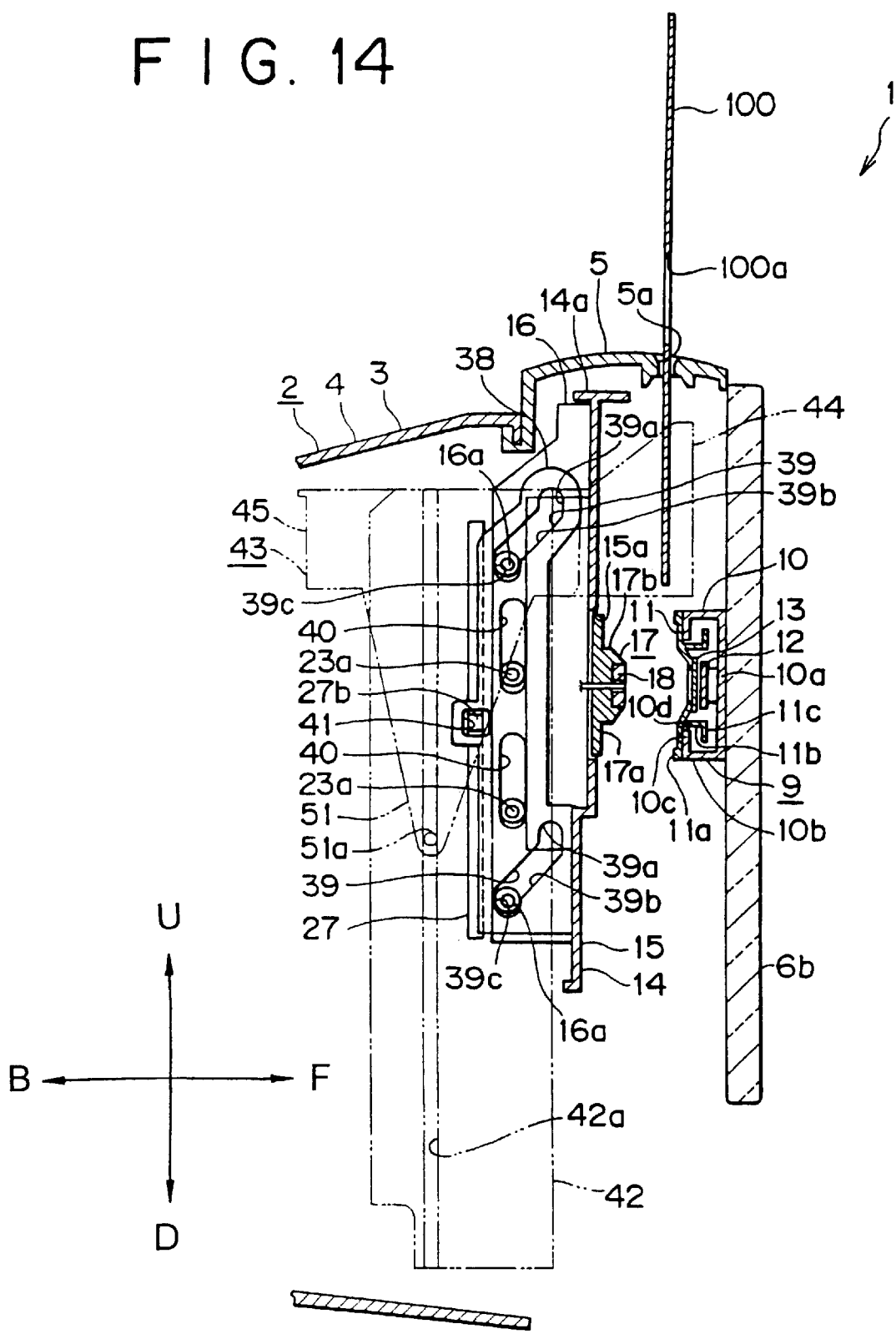
FIG. 14 is a schematic side elevational view illustrating, partly in section, the initial state.

The disk damper 9 includes a stabilizer 11 supported for rotation and for movement in a rotational axial direction, that is, in forward and backward directions on a body side support section 10 (refer to FIG. 1 and FIG. 14). The body side support section 10 has a disk portion 10a secured to the front panel 6, a cylindrical portion 10b extending rearwardly from a circumferential edge of the disk portion 10a, and an inward flange portion 10c extending inwardly from a rear edge of the cylindrical portion 10b, and has an opening formed as a support hole 10d on the rear face side thereof. A sub magnet 12 serving as attraction means is secured to a central portion of the rear face of the disk portion 10a.

The stabilizer 11 has a clamp portion 11a substantially in the form of a disk, a cylindrical portion 11b extending forwardly from an inner circumferential edge of the clamp portion 11a, and support projections 11c, 11c, 11c extending outwardly from a front end edge of the cylindrical portion 11b and spaced in a circumferential direction from each other. An iron plate 13 provided as an attracted portion is mounted in the inside of the cylindrical portion 11b. The cylindrical portion 11b of the stabilizer 11 has an outer diameter which is made a little smaller than the inner diameter of the support hole 10d of the body side support section 10.

The stabilizer 11 is supported for rotation and for movement in an axial direction, that is, in the forward and backward directions on the body side support section 10 with the support projections 11c, 11c, 11c thereof inserted in the inside of the body side support section 10. The disk damper 9 is secured to a substantially central portion of the front panel 6 in such a state that the disk portion 10a of the body side support section 10 contacts with the rear face of the transparent panel section 6b of the front panel 6. In a state wherein chucking of a compact disk (CD) which is used as a disk-type recording medium and is hereinafter described is not performed, the stabilizer 11 is in such a state that the iron plate 13 is attracted to the sub magnet 12 and the clamp portion 11a contacts with the inward flange portion 10c (refer to FIGS. 14 and 16).

A base unit 14 is supported for movement in the upward (U) and downward (D) directions and forward (F) and backward (B) directions on the front face side in the outer housing 3, and a rear member 16 is mounted on a front face member 15 of the base unit 14.

A base unit 14 is supported for movement in the upward and downward directions and forward and backward directions on the front face side in the outer housing 3, and a rear member 16 is mounted on a front face member 15 of the base unit 14.

The front face member 15 is in the form of a plate of a substantially rectangular shape as viewed from a forward or backward direction and has a circular arrangement hole 15a formed at a central portion thereof (refer to FIG. 1). A pass hole 15b elongated in the leftward and rightward directions is formed contiguously to the left end of the arrangement hole 15a in the front face member 15 (refer to FIG. 1).

A disk table 17 is disposed in the arrangement hole 15a of the front face member 15. The disk table 17 is rotated by a spindle motor not shown. The disk table 17 is provided as mounting means for mounting a disk-shaped recording medium and has a clamp portion 17a in the form of a disk and a fitting portion 17b extending forwardly from a central portion of the clamp portion 17a. A magnet 18 is buried in the fitting portion 17b. The magnetic force of the magnet 18 is set stronger than the magnetic force of the sub magnet 12 of the disk damper 9 described hereinabove.

Figure 3:
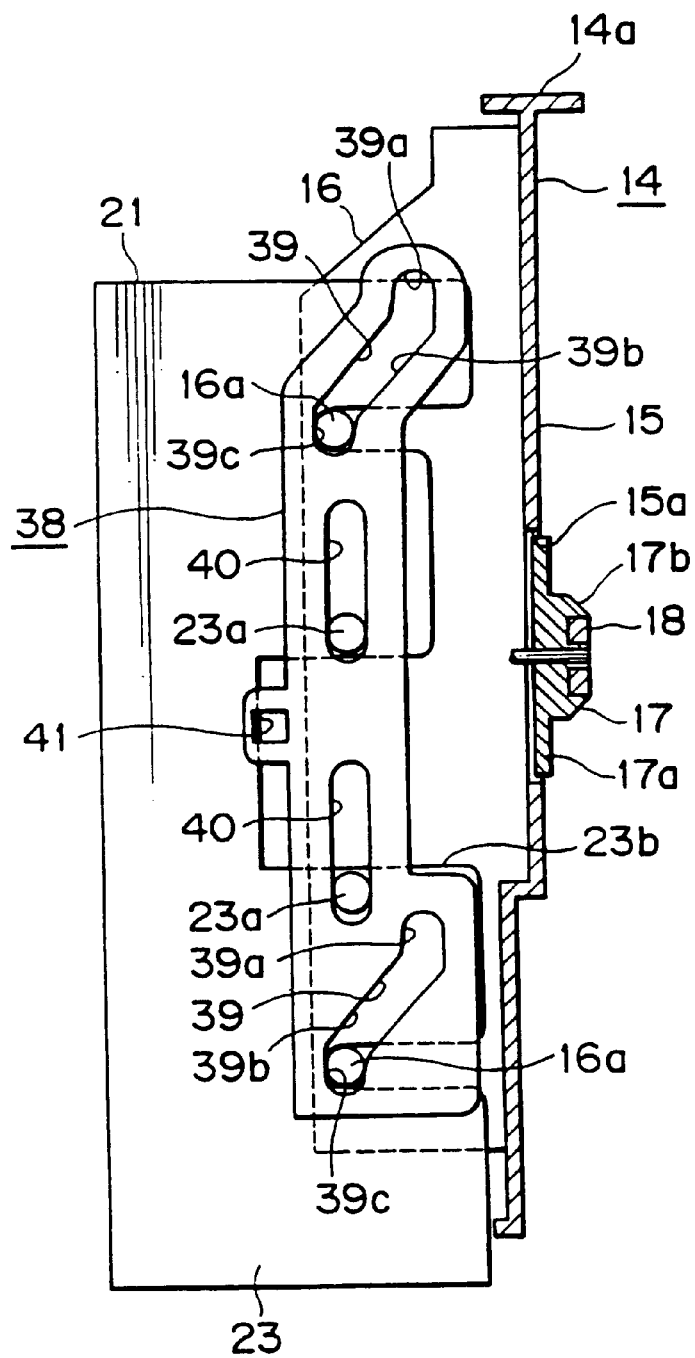
FIG. 3 is a schematic side elevational view illustrating, partly in section, a relationship among a base unit, a support base and a slide lever.

The disk table 17 is disposed in the arrangement hole 15a in such a state that the front face of the clamp portion 17a is positioned a little forwardly of the front face of the front face member 15 (refer to FIG. 3).

An optical pickup 19 is supported for movement in the leftward and rightward directions on the front face member 15 (refer to FIG. 1). The optical pickup 19 serves as reproduction means for performing reproduction of an information signal to be recorded into a CD.

A biaxial actuator 20 is provided for the optical pickup 19. When the optical pickup 19 is moved in the leftward or rightward direction, an objective lens 20a of the biaxial actuator 20 is moved in a corresponding relationship to the pass hole 15b of the front face member 15.

The rear member 16 has a substantially rectangular shape and is mounted on the rear face of the front face member 15 such that it covers the disk table 17 and the optical pickup 19 from rearwardly. A pair of support pins 16a, 16a are provided in an upwardly and downwardly spaced relationship from each other and extend from the opposite left and right faces of the rear member 16.

Figure 4:
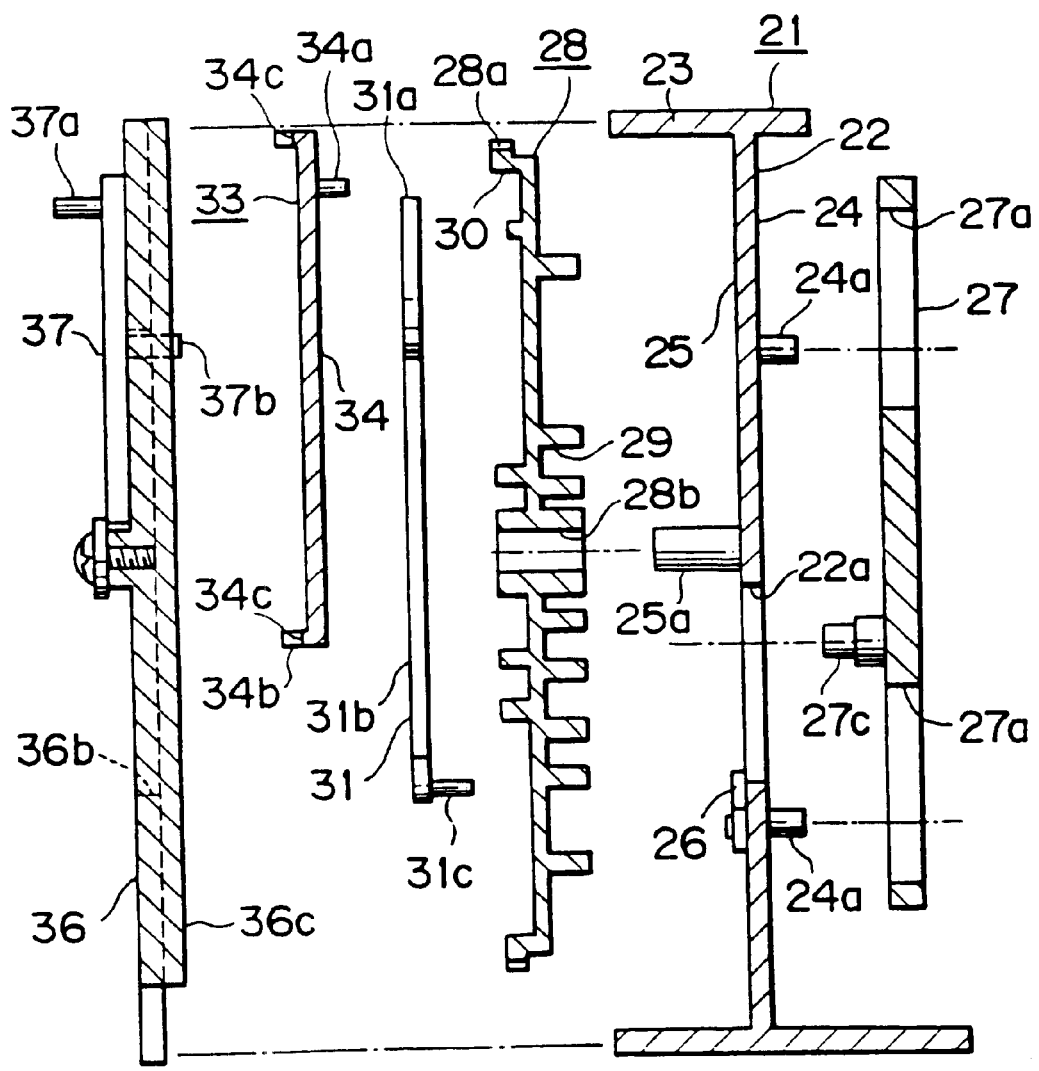
FIG. 4 is a schematic vertical sectional view illustrating an arrangement relationship of different members.

A support base 21 is disposed rearwardly of the base unit 14 (refer to FIGS. 3 and 4). The support base 21 includes a support face portion 22 directed in the forward and backward directions and a frame-like portion 23 provided integrally on a circumferential edge of the support face portion 22. A front face of the support face portion 22 is formed as a front side support portion 24, and a rear face of the support face portion 22 is formed as a rear side support portion 25.

A pair of guide pins 23a, 23a are provided in an upwardly and downwardly spaced relationship from each other and extend from each of the opposite left and right side faces of the frame-like portion 23, and a pair of recesses 23b, 23b which are open forwardly are formed between the guide pins 23a, 23a.

A pair of support projections 24a, 24a are provided in an upwardly and downwardly spaced relationship from each other and extend forwardly from a central portion of the front side support portion 24 in the leftward and rightward directions. A support shaft 25a projects rearwardly from a central portion of the rear side support portion 25. Further, an insertion hole 22a elongated in the upward and downward directions is formed in the support face portion 22 just below the support shaft 25a.

An operation switch 26 is disposed at a lower end portion of the rear side support portion 25. The operation switch 26 is operated for pivotal motion between a second detection position and a third detection position on the opposite sides of and with reference to a central first detection position. If any operation for the operation switch 26 is cancelled, then the operation switch 26 automatically returns to the first detection position to whichever one of the second detection position and the third detection position the operation switch 26 has been operated.

Figure 5:
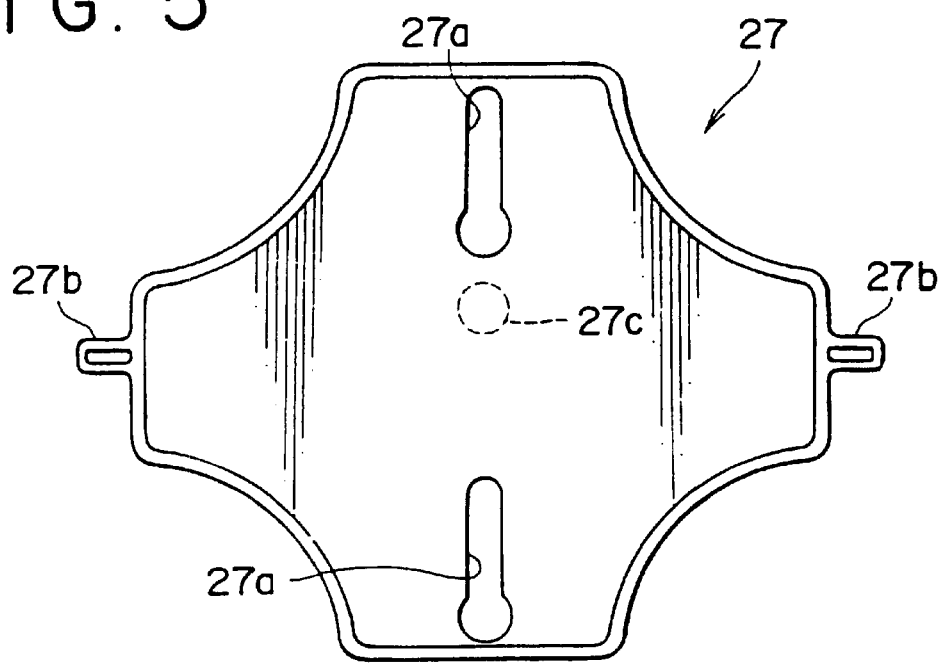
FIG. 5 is a front elevational view of a first lift member.
Figure 6:
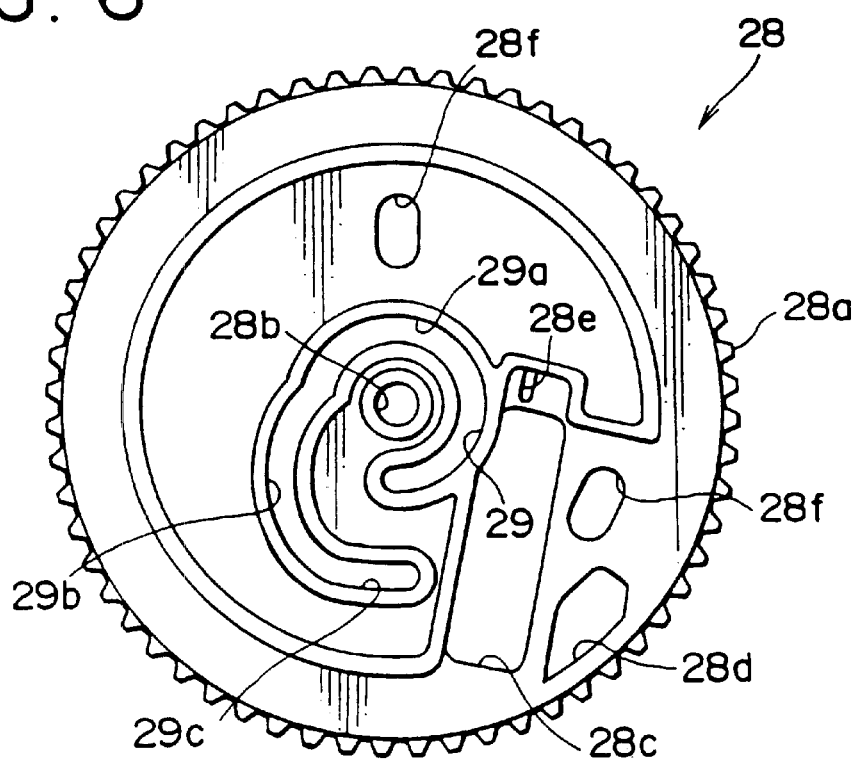
FIG. 6 is a front elevational view of a cam member.

A first lift member 27 is supported for sliding movement in the upward and downward directions on the front side support portion 24 (refer to FIGS. 4 and 5). A pair of supported holes 27a, 27a positioned in an upwardly and downwardly spaced relationship from each other and extending in the upward and downward directions are formed at a central portion of the first lift member 27 in the leftward and rightward directions. A pair of insertion projections 27b, 27b which extend outwardly are formed at the opposite left and right end portions of the first lift member 27 at a central portion in the upward and downward directions. Further, an engagement pin 27c which projects rearwardly is formed at a substantially central portion of the first lift member 27.

The first lift member 27 is supported at the supported holes 27a, 27a thereof on the support projections 24a, 24a of the support face portion 22 inserted to the supported holes 27a, 27a. In this state, the insertion projections 27b, 27b project outwardly from the recesses 23b, 23b of the frame-like portion 23. Meanwhile, the engagement pin 27c projects rearwardly from the insertion hole 22a formed in the support face portion 22.

A cam member 28 is in the form of a disk and has a gear portion 28a formed on an overall periphery thereof while a supported hole 28b is formed at a central portion thereof (refer to FIGS. 4 and 6 to 8). A first cam groove 29 is formed on a front face of the cam member 28. The first cam groove 29 is composed of a non-driving portion 29a positioned around the supported hole 28b and having an arcuate shape, a driving portion 29b contiguous to the non-driving portion 29a and having a curved shape, and a locking portion 29c contiguous to the driving portion 29b (refer to FIG. 6).

A second cam groove 30 is formed on a rear face of the cam member 28. The second cam groove 30 is composed of a starting end portion 30a, an operating portion 30b contiguous to the starting end portion 30a, a non-operating portion 30c contiguous to the operating portion 30b, and a terminal end portion 30d contiguous to the non-operating portion 30c (refer to FIGS. 7 and 8).

The starting end portion 30a is positioned rather near to the outer periphery of the cam member 28 and formed in a short arc. The operating portion 30b is formed in a curve which displaces toward the center of the cam member 28 as the distance from the starting end portion 30a increases. The non-operating portion 30c is positioned around the supported hole 28b and formed in an arc. Also the terminal end portion 30d is formed around the supported hole 28b and formed as a moderate curve which is convex toward the center side of the cam member 28. Further, the starting end portion 30a is formed with a greater width than the other portions of the second cam groove 30.

A spring arrangement hole 28c in the form of an elongated hole is formed in the cam member 28, and a fitting hole 28d and a spring anchoring hole 28e are formed at different positions of the cam member 28 in the proximity of the spring arrangement hole 28c. Further, a pair of support holes 28f, 28f each in the form of an elongated hole extending substantially in the same direction are formed at predetermined positions of the cam member 28 (refer to FIG. 6). Furthermore, a control portion 28g in the form of a shoulder is formed on the cam member 28 in the proximity of the starting end portion 30a of the second cam groove 30 (refer to FIGS. 7 and 8).

Figure 7:
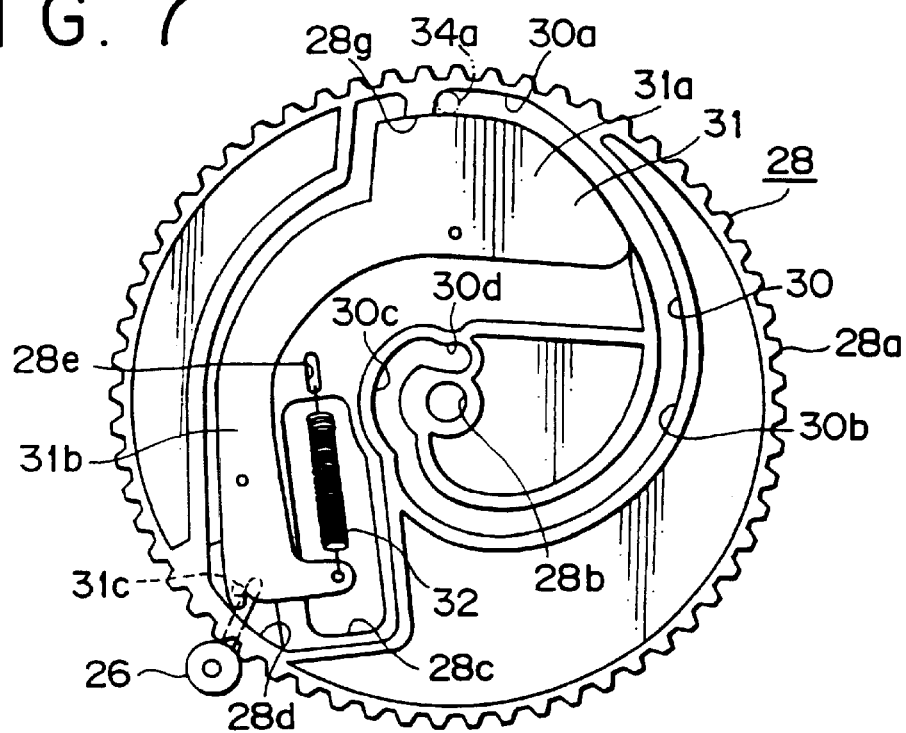
FIG. 7 shows the cam member on which an operation member is supported together with FIG. 8 and is a rear elevational view illustrating a state wherein the operation member is not pressed.
Figure 8:
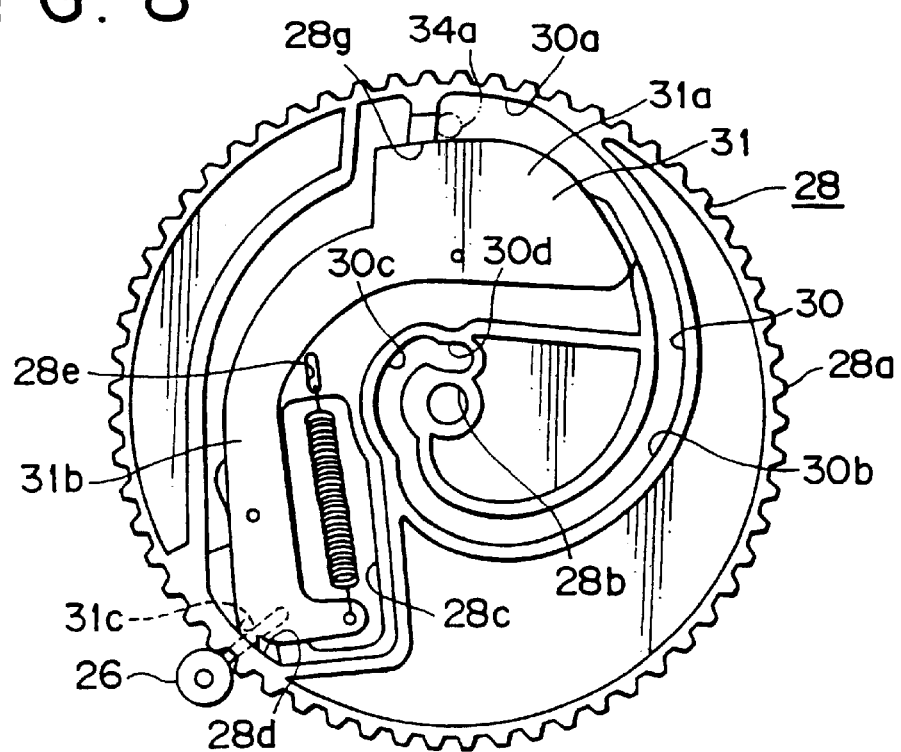
FIG. 8 is a rear elevational view illustrating a state wherein the operation member is pressed.

An operation member 31 is supported for movement on the rear face of the cam member 28 (refer to FIGS. 7 and 8). The operation member 31 is in the form of a plate of a substantially J shape and has an end portion formed as a pressed portion 31a of an increased width. An operation portion 31c in the form of a shaft extending forwardly is formed at a portion rather near to an end of the other portion 31b of the operation member 31 than the pressed portion 31a.

The operation member 31 is supported at the pressed portion 31a and the portion 31b thereof in the support holes 28f, 28f of the cam member 28 for movement such that the pressed portion 31a moves toward and away from the center of the cam member 28.

In a state wherein the operation member 31 is supported on the cam member 28, the operation portion 31c projects forwardly from the fitting hole 28d of the cam member 28. Further, in a state wherein the operation member 31 is supported on the cam member 28, a tension coil spring 32 disposed as a biasing member in the spring arrangement hole 28c is stretched between an end portion of the portion 31b and the spring anchoring hole 28e of the cam member 28. A biasing force in a direction in which the pressed portion 31a is spaced away from the center of the cam member 28 is applied to the operation member 31 from the tension coil spring 32. The operation member 31 which is biased in the direction in which it is spaced away from the center of the cam member 28 is prevented, at the pressed portion 31a thereof, from movement in the biased direction by the control portion 28g formed on the cam member 28.

While the operation member 31 is biased by the tension coil spring 32 but is prevented from movement by the control portion 28g, the pressed portion 31a thereof covers an inner circumferential side portion of the starting end portion 30a of the second cam groove 30 (refer to FIG. 7).

The cam member 28 is supported for rotation on the rear side support portion 25 with the supported hole 28b thereof fitted on the support shaft 25a of the support face portion 22 while the operation member 31 is supported thereon. A driving gear not shown is held in meshing engagement with the gear portion 28a while the cam member 28 is supported on the rear side support portion 25. The driving gear is rotated by driving force transmitted thereto from a driving motor not shown which can rotate both forwardly and reversely. Further, the engagement pin 27c of the first lift member 27 is engaged for sliding movement in the first cam groove 29 of the cam member 28.

Figure 9:
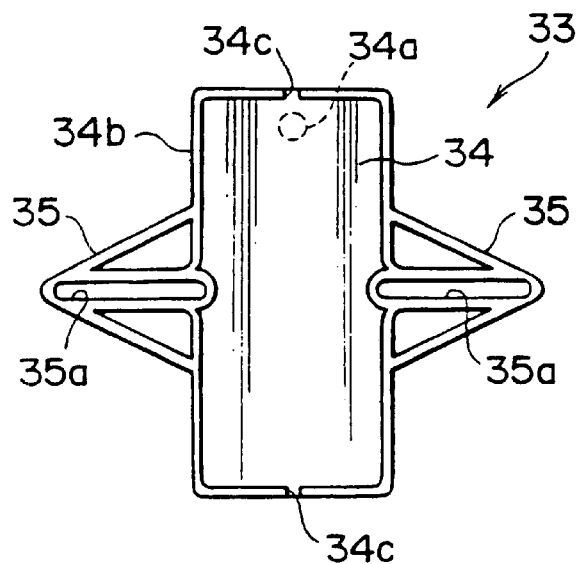
FIG. 9 is a rear elevational view showing a second lift member.

A second lift member 33 has a base portion 34 and projecting portions 35, 35 formed integrally thereon and is mounted for movement in the upward and downward directions (refer to FIGS. 4 and 9).

The base portion 34 is formed in the upward and downward directions in a vertically elongated rectangular shape and has a forwardly extending engaging projection 34a formed at an upper end portion thereof. Further, an outer peripheral wall 34b projecting rearwardly is formed on an outer periphery of the base portion 34, and a pair of slits 34c, 34c are formed at positions of the outer peripheral wall 34b corresponding to central portions of an upper edge and a lower edge of the base portion 34 in the leftward and rightward directions.

The projecting portions 35, 35 extend sidewardly from a central portion of the base portion 34 in the upward and downward directions, and individually have engaging holes 35a, 35a which extend in the leftward and rightward directions.

The second lift member 33 has an engaging projection 34a engaged for sliding movement in the second cam groove 30 of the cam member 28 and is moved in the upward or downward direction upon rotation of the cam member 28.

Figure 10:
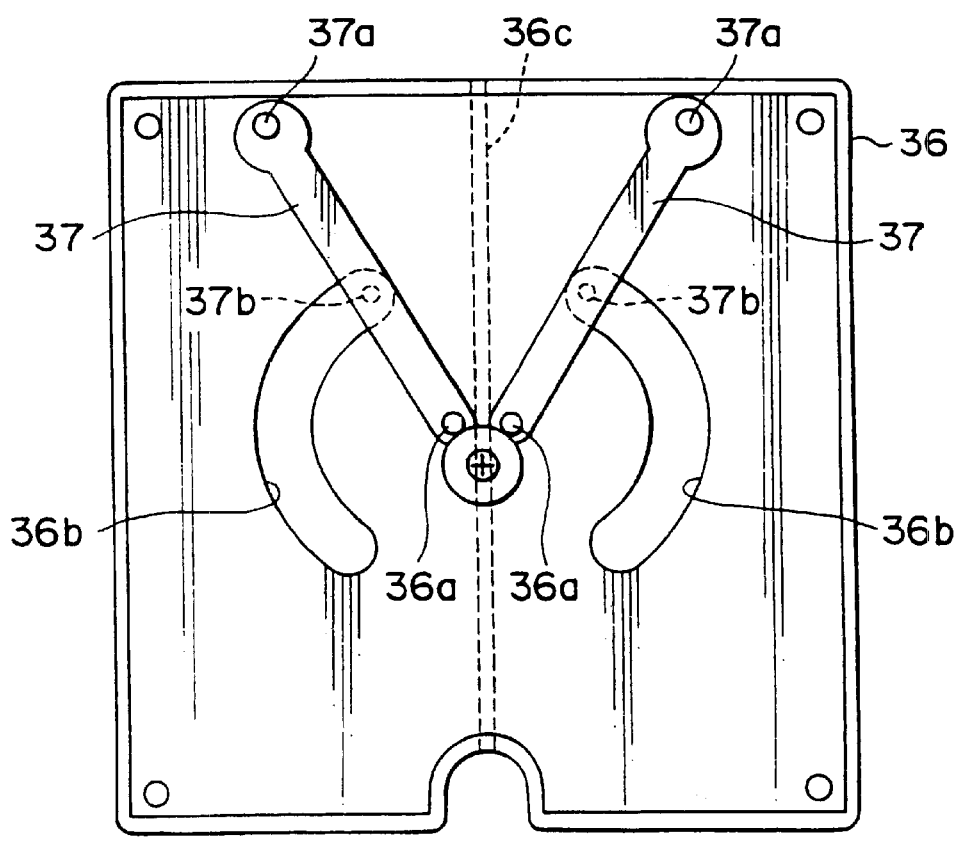
FIG. 10 is a rear elevational view showing a cover.

A cover 36 is mounted on the frame-like portion 23 of the support base 21 from the rear side (refer to FIGS. 4 and 10). Accordingly, the cam member 28 and the second lift member 33 are disposed in a space between the support face portion 22 of the support base 21 and the cover 36.

The cover 36 is in the form of a plate of a substantially square shape as viewed from the forward or backward direction, and a pair of support shafts 36a, 36a extending rearwardly are provided in a leftwardly and rightwardly spaced relationship from each other at a substantially central portion of the cover 36. A pair of arcuate holes 36b, 36b which are convex are formed at left and right positions with respect to a central portion of the cover 36. Further, a guide projection 36c which extends upwardly and downwardly is formed at a central portion of the front face of the cover 36 in the leftward and rightward directions, and the slits 34c, 34c of the second lift member 33 are engaged with the guide projection 36c so that the second lift member 33 is moved in the upward and downward directions under the guidance of the guide projection 36c upon rotation of the cam member 28.

Pivotal members 37, 37 extend in one direction and are supported at one end portions thereof on the support shafts 36a, 36a of the cover 36 for pivotal motion on the cover 36 around the support shafts 36a, 36a (refer to FIG. 10). First engaging shafts 37a, 37a which extend rearwardly are formed at the other end portions of the pivotal members 37, 37, and second engaging shafts 37b, 37b which extend forwardly are formed at intermediate portions of the pivotal members 37, 37.

When the pivotal members 37, 37 are supported on the cover 36, the second engaging shafts 37b, 37b project forwardly from the arcuate holes 36b, 36b of the cover 36, and the pivotal members 37, 37 are pivoted within a range within which the second engaging shafts 37b, 37b are moved within the arcuate holes 36b, 36b.

A pair of slide levers 38, 38 are formed such that they are elongated substantially in the upward and downward directions and have cam holes 39, 39 formed at the opposite upper and lower end portions thereof (refer to FIG. 3). Each of the cam holes 39, 39 is composed of an upper vertical portion 39a positioned at an upper portion and extending in the upward and downward directions, an inclined portion 39b which is formed contiguously to the upper vertical portion 39a and displaced rearwardly toward the lower end thereof, and a lower vertical portion 39c contiguous to the inclined portion 39b and extending in the upward and downward directions.

Guided holes 40, 40 are formed in an upwardly and downwardly spaced relationship from each other at positions between the cam holes 39, 39 in the slide levers 38, 38 and guided holes 40, 40 are elongated substantially in the upward and downward directions. Further, supported holes 41, 41 are formed at substantially central portions of the slide levers 38, 38 in the upward and downward directions.

The support pins 16a, 16a formed on the rear member 16 of the base unit 14 are engaged for sliding movement in the cam holes 39, 39 of the slide levers 38, 38 and the guide pins 23a, 23a formed on the frame-like portion 23 of the support base 21 are engaged for sliding movement in the guided holes 40, 40 to thereby interconnect the base unit 14 and the support base 21 (refer to FIG. 3).

The insertion projections 27b, 27b of the first lift member 27 supported on the front side support portion 24 of the support base 21 are inserted in the supported holes 41, 41 of the slide levers 38, 38, and accordingly the slide levers 38, 38 are moved as the first lift member 27 moves in the upward and downward directions.

Figure 11:
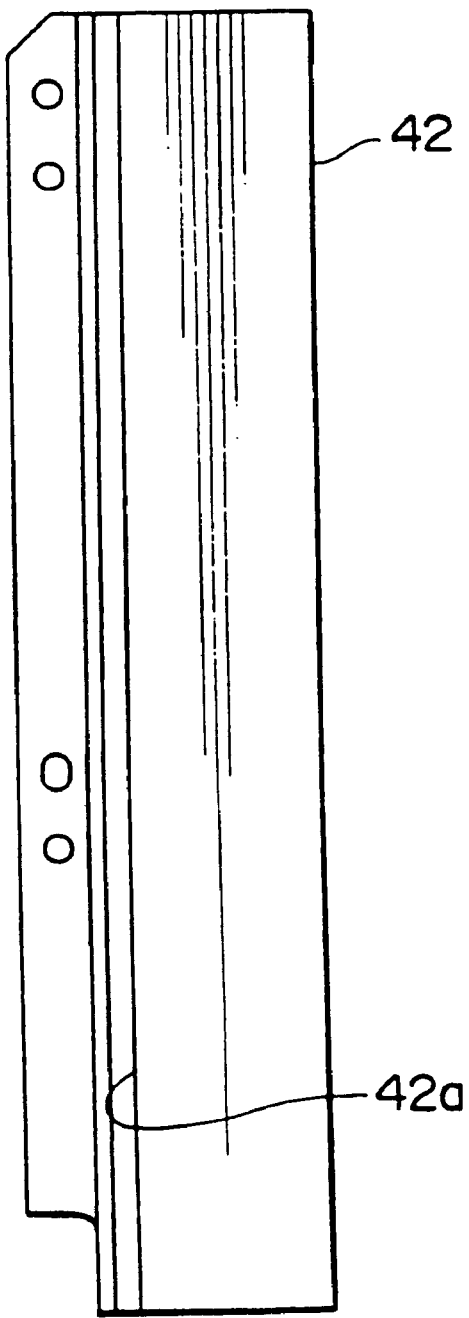
FIG. 11 is a side elevational view showing a side plate.

A pair of side plates 42, 42 are mounted on the opposite side faces of the frame-like portion 23 of the support base 21 in such a manner that they cover the slide levers 38, 38. Guide grooves 42a, 42a which individually extend in the upward and downward directions are formed on outer faces of the side plates 42, 42 (refer to FIG. 11).

Figure 12:
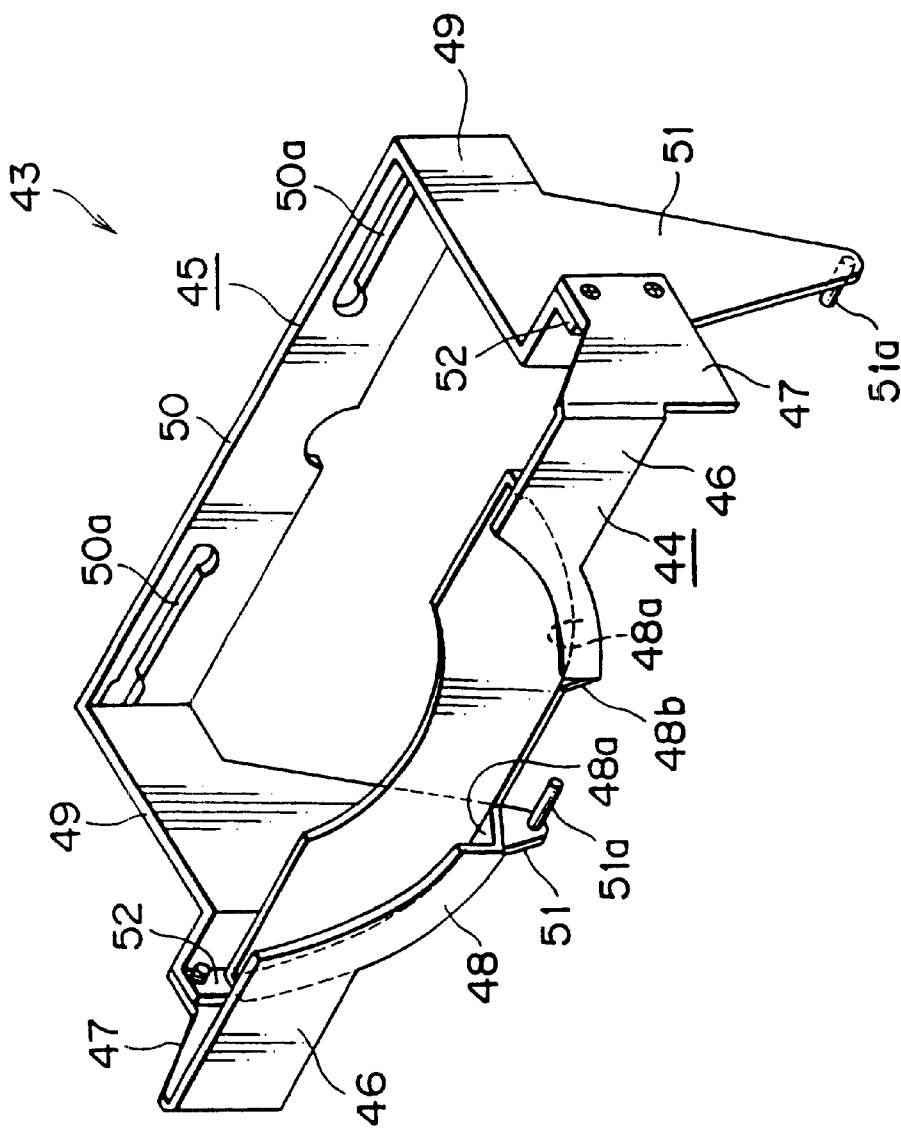
FIG. 12 is a perspective view showing a holder.

A holder 43 is formed from a disk hold member 44 and a supported member 45 coupled forwardly and backwardly to each other. The disk hold member 44 is formed from a transparent material (refer to FIG. 12). The holder 43 serves as carrying means for carrying a CD.

The disk hold member 44 is formed as a unitary member from a pair of front plate portions 46, 46, a pair of side plate portions 47, 47 and a holding portion 48.

The front plate portions 46, 46 extend in the leftward and rightward directions and are positioned in a leftwardly and rightwardly spaced relationship from each other. The side plate portions 47, 47 are formed such that they individually extend rearwardly from outer ends of the front plate portions 46, 46. The holding portion 48 is formed such that it interconnects the front plate portions 46, 46 and has a pair of holding grooves 48a, 48a positioned in a leftwardly and rightwardly spaced relationship from each other and each having an arcuate shape which displaces upwardly toward the outer side. The holding grooves 48a, 48a define a recess 48b therebetween.

The supported member 45 is formed as a unitary member from a pair of side portions 49, 49, a connecting portion 50, a pair of projections 51, 51, and a pair of mounting portions 52, 52.

Rear edges of the side portions 49, 49 are connected to each other by the connecting portion 50 which is elongated in the leftward and rightward directions, and engaging holes 50a, 50a extending in the leftward and rightward directions are formed at the opposite left and right end portions of the connecting portion 50. The projections 51, 51 are formed such that they extend downwardly from the side portions 49, 49 and individually have, at lower end portions thereof, guide grooves 51a, 51a which extend inwardly. The mounting portions 52, 52 are formed such that they extend outwardly from front edges of the side portions 49, 49, and rear end portions of the side plate portions 47, 47 of the disk hold member 44 are attached to end portions of the mounting portions 52, 52.

The guide grooves 51a, 51a of the supported member 45 of the holder 43 are engaged for sliding movement in the guide grooves 42a, 42a of the side plates 42, 42. The first engaging shafts 37a, 37a of the pivotal members 37, 37 are engaged for sliding movement in the engaging holes 50a, 50a of the supported member 45. Accordingly, the holder 43 is moved in the upward and downward directions upon pivotal motion of the pivotal members 37, 37 as the guide grooves 51a, 51a are guided by the guide grooves 42a, 42a.

In the following, a loading operation and an ejection operation of the disk playback apparatus 1 are described. It is to be noted that the description of the operations is given of a case wherein a compact disk (CD) 100 of a diameter of approximately 12 cm is used.

Figure 13:
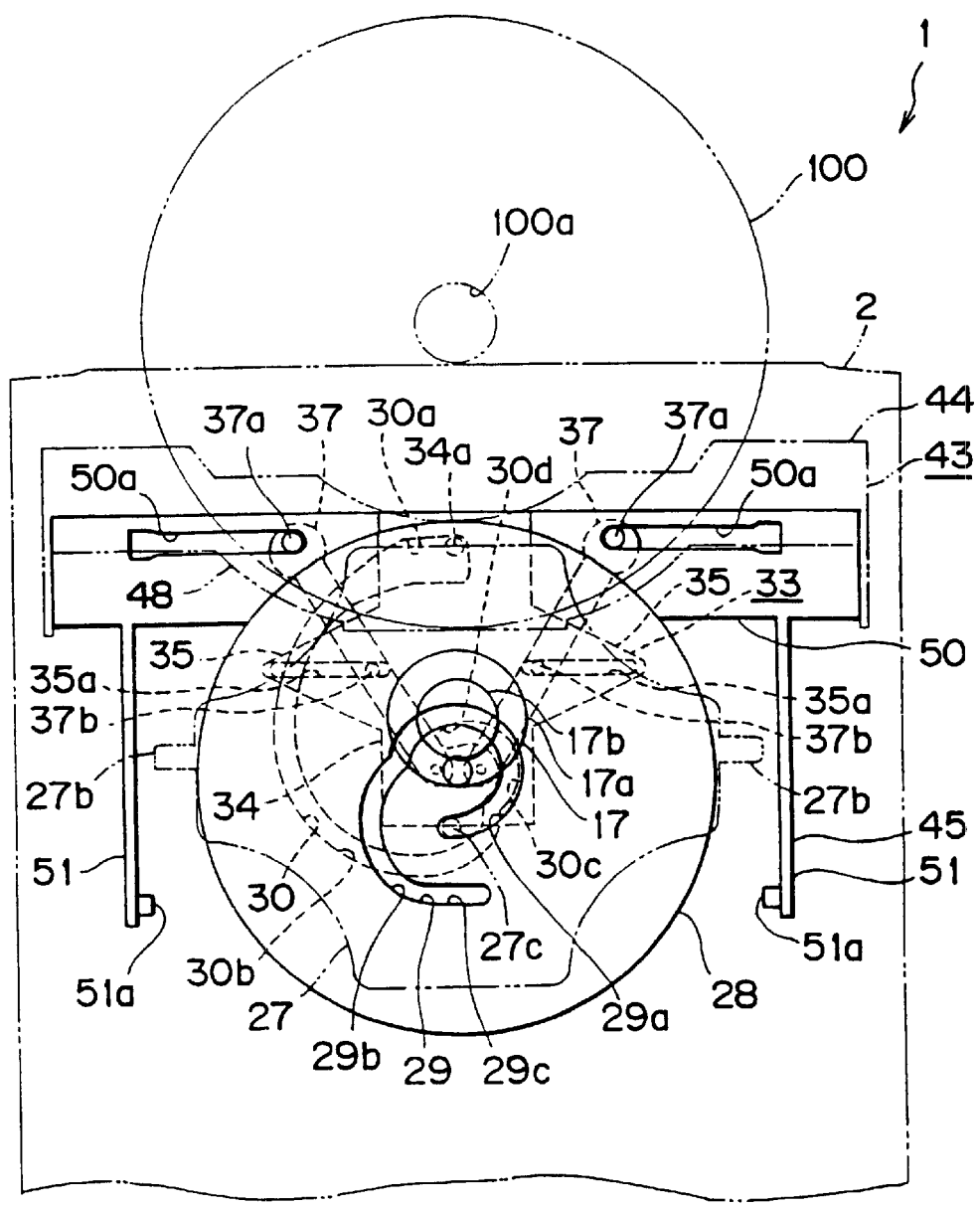
FIG. 13 illustrates operation of the disk playback apparatus together with FIGS. 14 to 19 and is a schematic front elevational view illustrating an initial state.

First, a state (initial state) before a loading operation is performed is described (refer to FIGS. 13 and 14).

The support pins 16a, 16a, . . . of the base unit 14 are individually engaged in the lower vertical portion 39c, 39c, . . . of the cam holes 39, 39, . . . of the slide levers 38, 38. The guide pins 23a, 23a, . . . of the support base 21 are individually engaged with the lower ends of the guided holes 40, 40, . . . of the slide levers 38, 38. Accordingly, the base unit 14 is positioned at the movement end on the rear side.

Since the base unit 14 is positioned at the movement end on the rear side, it is not present just below the insertion slot 5a of the top panel 5. Accordingly, the insertion slot 5a is in an open state and the user can insert the CD 100 into the insertion slot 5a.

Since the base unit 14 is positioned at the movement end of the rear side, the iron plate 13 of the disk damper 9 is not attracted to the magnet 18 of the disk table 17, but the iron plate 13 is attracted to the sub magnet 12 and the stabilizer 11 is in contact with the body side support section 10. Consequently, a space of a size sufficient to insert the CD 100 is formed between the stabilizer 11 and the disk table 17.

The starting end portion 30a of the second cam groove 30 of the cam member 28 is positioned just above the center of rotation of the cam member 28. Accordingly, the start end of the non-driving portion 29a of the first cam groove 29 is positioned just below the center of rotation of the cam member 28.

The engaging projection 34a of the second lift member 33 is engaged with the starting end portion 30a of the second cam groove 30 and positioned at the movement end on the upper side. Then, the engaging projection 34a is in contact with the pressed portion 31a of the operation member 31 (refer to FIG. 7). Accordingly, if the second lift member 33 is moved downwardly, then the operation member 31 can be pushed downwardly by the engaging projection 34a. Further, in this state, the operation portion 31c of the operation member 31 operates the operation switch 26 to the second detection position (refer to FIG. 7).

The engagement pin 27c of the first lift member 27 is in engagement with the start end of the non-driving portion 29a of the first cam groove 29. Accordingly, the first lift member 27 is positioned at the movement end of the upper side.

The second engaging shafts 37b, 37b of the pivotal members 37, 37 are in engagement with the inner ends of the engaging holes 35a, 35a of the second lift member 33, and the first engaging shafts 37a, 37a are in engagement with the inner ends of the engaging holes 50a, 50a of the holder 43. The pivotal members 37, 37 are arranged to form a V shape which opens upwardly. The holder 43 is positioned at the movement end on the upper side.

If, in the initial state described above, the CD 100 is inserted into the insertion slot 5a in such orientation that the principal face thereof is directed in the forward or backward direction, then it is placed in the holding grooves 48a, 48a of the holder 43 and held by the disk hold member 44 (refer to FIGS. 1, 13 and 14). Then, if the operation button 7 for loading provided on the front panel 6 is manually pressed, then the driving motor is rotated to start loading of the CD 100 being held.

If the driving motor is rotated in one direction, then the cam member 28 is rotated in the clockwise direction as viewed from the front. When the cam member 28 is rotated, the position of the engaging projection 34a with respect to the second cam groove 30 is varied, and the second lift member 33 is moved downwardly. Meanwhile, the engagement pin 27c of the first lift member 27 is moved in the non-driving portion 29a of an arcuate shape of the first cam groove 29, and consequently, the first lift member 27 is not moved.

The second lift member 33 is moved downwardly as the engaging projection 34a thereof is moved within the operating portion 30b past the starting end portion 30a of the second cam groove 30. As the second lift member 33 is moved downwardly, since the second engaging shafts 37b, 37b are in sliding engagement in the engaging holes 35a, 35a, the pivotal members 37, 37 are pivoted in a direction in which the end portions thereof are moved downwardly. Then, since the first engaging shafts 37a, 37a of the pivotal members 37, 37 are in sliding engagement in the engaging holes 50a, 50a of the holder 43, the holder 43 which holds the CD 100 thereon is moved downwardly by pivotal motion of the pivotal members 37, 37.

When the second lift member 33 is moved downwardly and the engaging projection 34a reaches the terminal end of the operating portion 30b of the second cam groove 30, the downward movement of the holder 43 is ended once. At this time, a center hole 100a of the CD 100 is positioned between the disk clamper 9 and the disk table so that a state wherein chucking of the CD 100 is possible is established (refer to FIG. 16).

Figure 15:
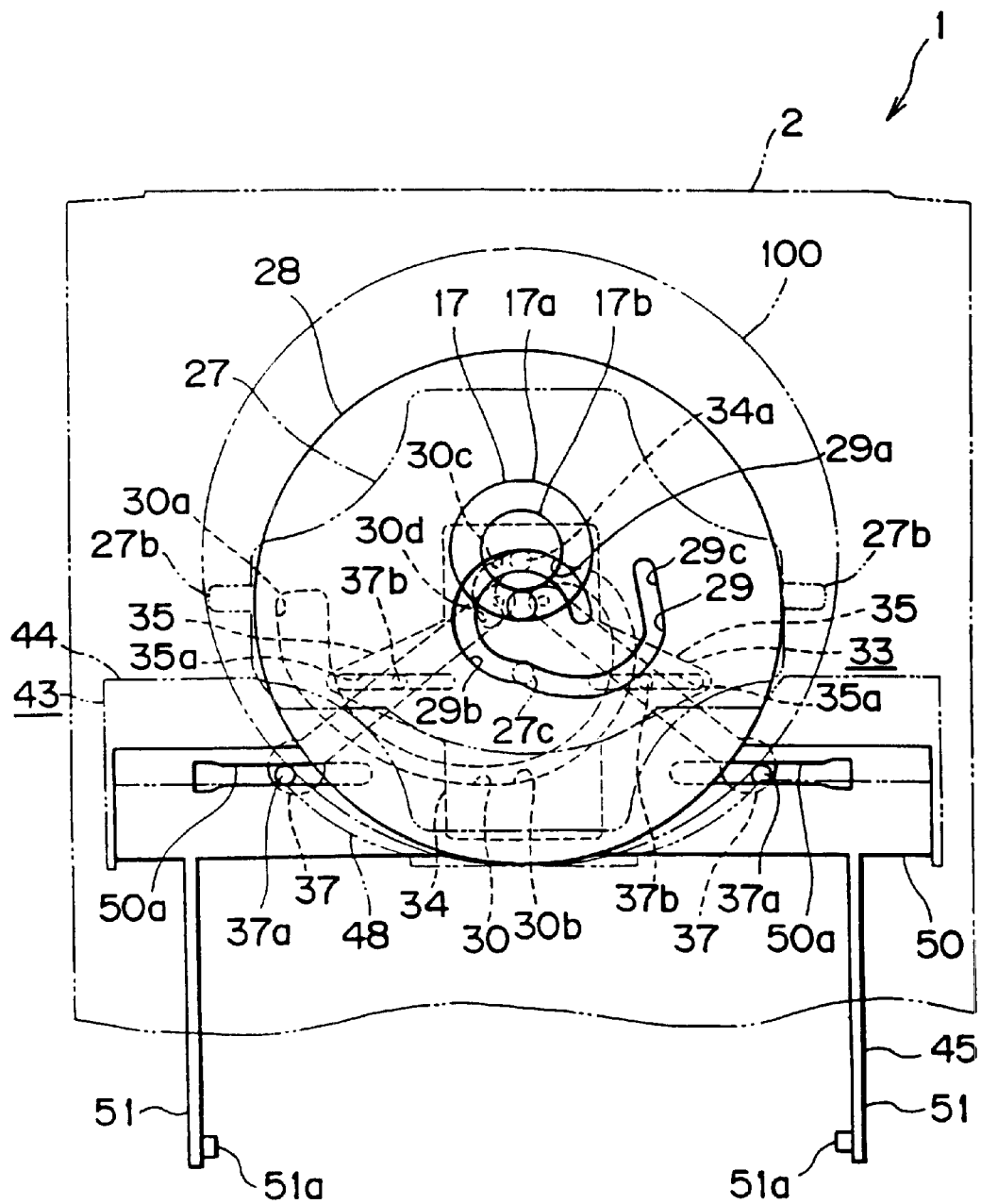
FIG. 15 is a schematic front elevational view illustrating a state wherein a CD is positioned between a disk table and a disk clamper.

The driving motor is rotated continuously to rotate the cam member 28, and the engaging projection 34a of the second lift member 33 is moved within the non-operating portion 30c of the second cam groove 30 (refer to FIG. 15). Since the non-operating portion 30c is formed in an arcuate shape centered at the center of rotation of the cam member 28, the second lift member 33 is not moved, and accordingly, the holder 43 is not moved upwardly or downwardly either.

The engaging pin 27c of the first lift member 27 is moved in the driving portion 29b from the non-driving portion 29a of the first cam groove 29 as the cam member 28 rotates. When the engagement pin 27c is moved in the driving portion 29b, the first lift member 27 is moved downwardly.

When the first lift member 27 is moved downwardly, since the insertion projections 27b, 27b are inserted in the supported holes 41, 41 of the slide levers 38, 38, the slide levers 38, 38 are moved downwardly. Since the support pins 16a, 16a formed on the base unit 14 are in sliding engagement in the cam holes 39, 39 of the slide levers 38, 38, the support pins 16a, 16a are moved upwardly relative to the slide levers 38, 38 by the downward moment of the slide levers 38, 38.

When the support pins 16a, 16a are moved upwardly in the inclined portions 39b, 39b of the cam holes 39, 39, the base unit 14 is moved forwardly. When the base unit 14 is moved forwardly, the disk table 17 approaches the disk clamper 9 and the fitting portion 17b is inserted into the center hole 100a of the CD 100.

Figure 18:
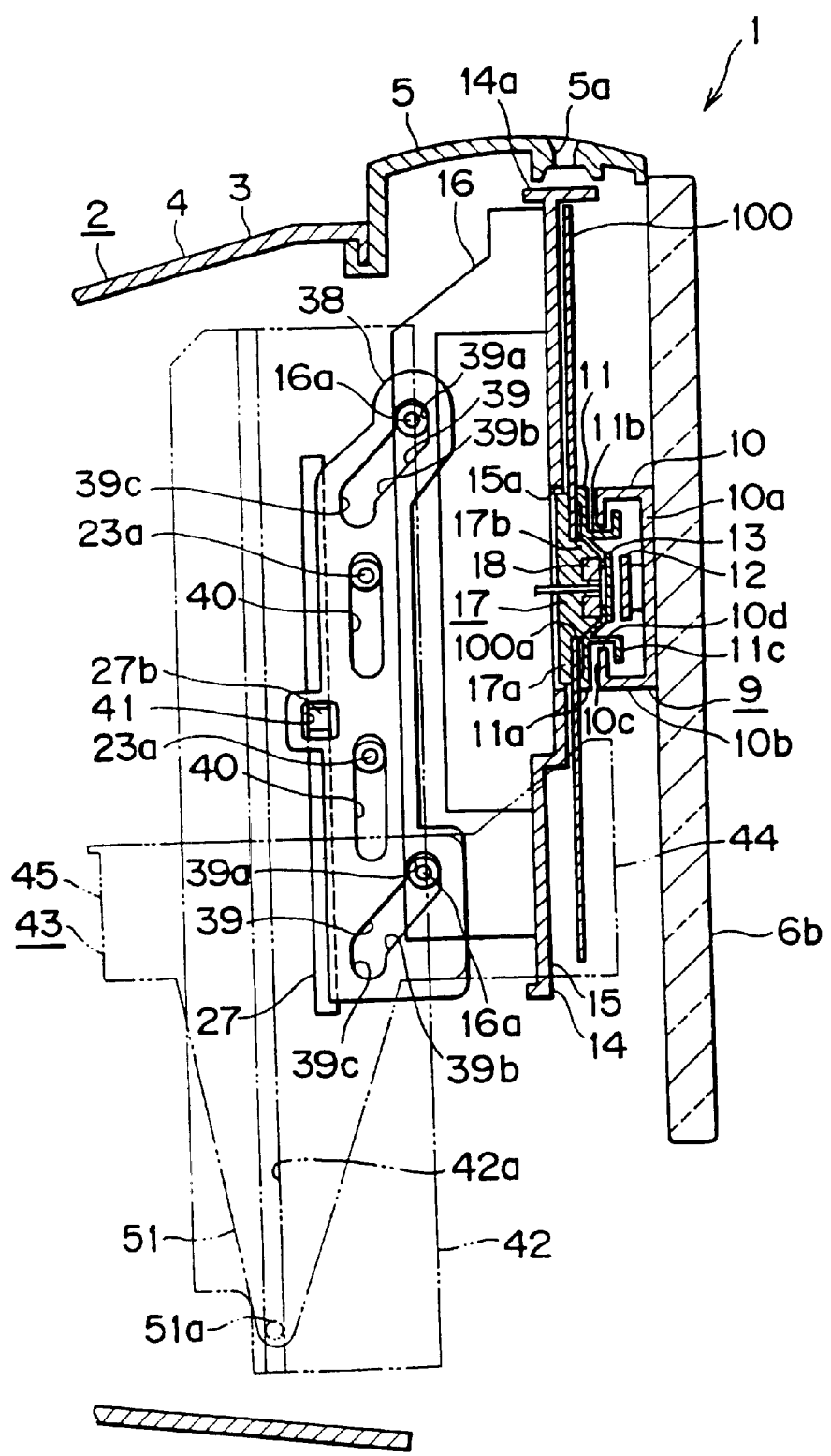
FIG. 18 is a schematic side elevational view illustrating, partly in section, the state wherein the CD is chucked.

Since the magnet 18 of the disk table 17 has stronger magnetic force than the sub magnet 12 of the disk damper 9, when the base unit 14 is moved forwardly and reaches a predetermined position, the iron plate 13 of the stabilizer 11 is attracted by the magnet 18 and the stabilizer 11 is spaced away from the body side support section 10 and accordingly, the CD 100 is held by the clamp portion 17a of the disk table 17 and the clamp portion 11a of the stabilizer 11, thereby completing chucking of the CD 100 (refer to FIG. 18).

Accordingly, before the CD 100 is inserted between the disk clamper 9 and the disk table 17, since the iron plate 13 of the stabilizer 11 is attracted to the sub magnet 12 of the body side support section 10 and the stabilizer 11 is in contact with the body side support section 10 as described above, when the stabilizer 11 carries the CD 100, the CD 100 is not contacted with the stabilizer. Further, since, upon chucking, the iron plate 13 is attracted to the magnet 18 of the disk table 17, optimization of a loading operation, an ejecting operation and a chucking operation for the CD 100 can be achieved.

Particularly, where a loading apparatus of the vertical type which moves a CD 100 upwardly and downwardly is provided as in the disk playback apparatus 1, the stabilizer 11 is liable to be put into a state that it is inclined with respect to the body side support section 10. However, to keep the stabilizer 11 in contact with the body side support section 10 when chucking is not performed is more effective to achieve optimization of a loading operation, an ejecting operation and a chucking operation.

Further, in the disk playback apparatus 1, in order to keep, when chucking is not performed, the stabilizer 11 in an optimal posture with respect to the body side support section 10, the iron plate 13 provided on the stabilizer 11 is attracted to the sub magnet 12 provided on the body side support section 10, and a mechanism for keeping the stabilizer 11 in an optimal posture with respect to the body side support section 10 is not particularly present around the disk clamper 9.

Accordingly, the appearance when a user visually watches the transparent panel section 6b of the front panel 6 is good, and augmentation of the design performance can be anticipated.

In the disk damper 9, since the sub magnet 12 having magnetic force weaker than that of the magnet 18 of the disk table 17 is provided on the body side support section 10, when the CD 100 is to be chucked, the iron plate 13 is attracted with certainty to the magnet 18, and the chucking operation can be performed with certainty. Further, optimization of a loading operation and so forth can be achieved only by suitably setting the distance between the disk damper 9 and the disk table 17 which is moved toward and away from the disk damper 9, designing is facilitated and augmentation of the degree of freedom in designing can be anticipated as much.

It is to be noted that, while, in the foregoing description, the iron plate 13 is provided on the stabilizer 11 and is attracted to the sub magnet 12 or the magnet 18, it is otherwise possible to conversely provide a magnet on the stabilizer 11 and dispose a magnetic metal material such as an iron plate on each of the body side support section 10 and the disk table 17.

However, where the sub magnet 12 and the magnet 18 are provided on the opposite sides of the iron plate 13 as in the disk playback apparatus 1, optimization of a loading operation, an ejecting operation and a chucking operation for the CD 100 can be anticipated and designing is simplified only by changing the magnetic forces of the two magnets.

Further, the sizes and the shapes of the sub magnet 12, magnet 18 and iron plate 13 and the distances between them can be set suitably, and by such suitable setting, optimum setting for moving, when chucking is to be performed, the stabilizer 11 optimally to the disk table 17 side with the CD 100 interposed therebetween and moving, when chucking is not performed, the stabilizer 11 optimally to the body side support section 10 side can be performed.

When a chucking operation for the CD 100 is to be performed, the base unit 14 is moved forwardly as described hereinabove. Then, since the base unit 14 is moved forwardly, the insertion slot of the top panel 5 is closed from the lower side by an upper face portion 14a of the base unit 14 (refer to FIG. 18). Accordingly, the upper face portion 14a of the base unit 14 functions as a shutter for opening and closing the insertion slot 5a.

Figure 17:
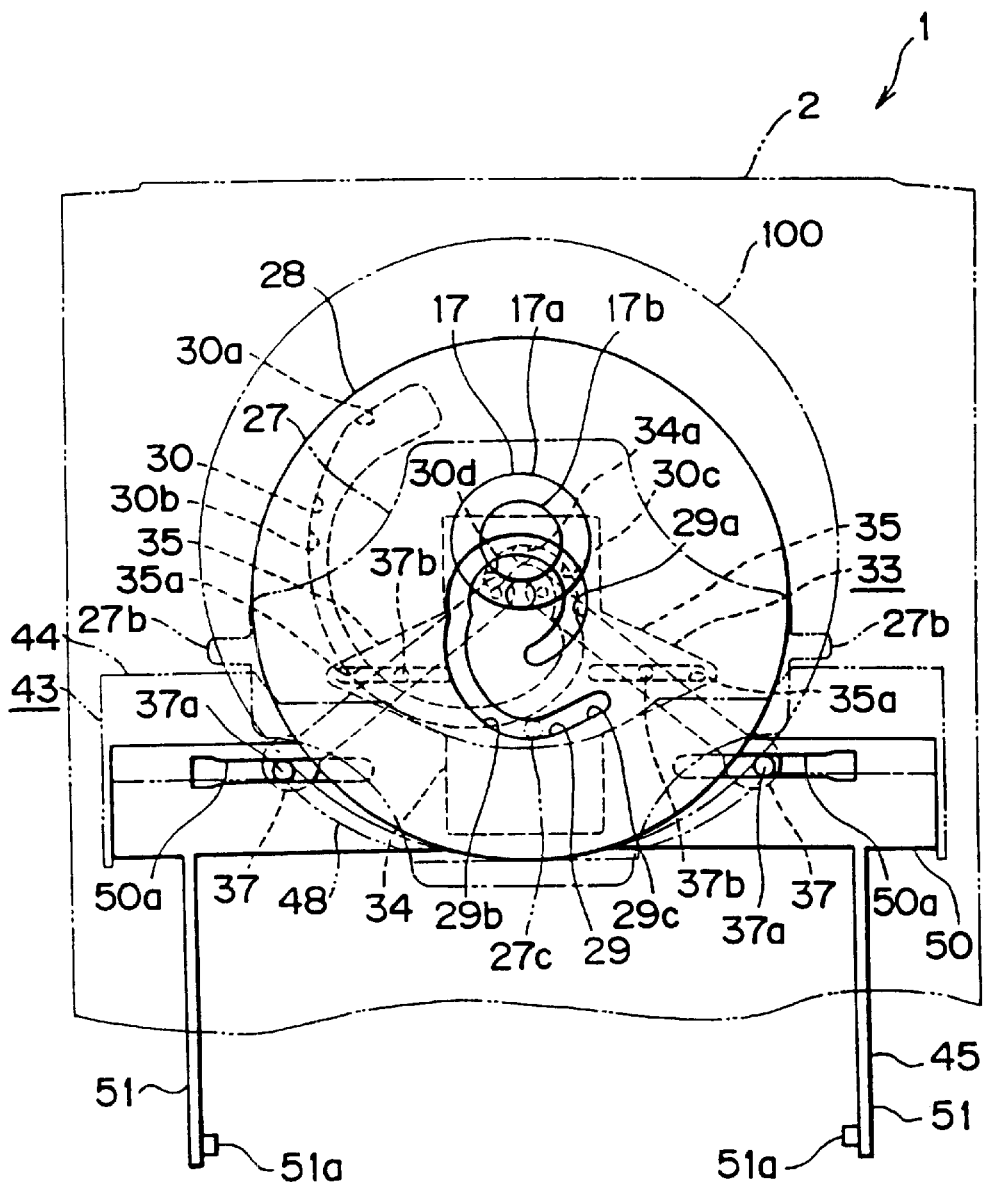
FIG. 17 is a schematic front elevational view illustrating a state wherein the CD is chucked.

In a state wherein the chucking of the CD 100 is completed, the engaging projection 34a of the second lift member 33 is engaged with the terminal end of the non-operating portion 30c of the second cam groove 30, and the engagement pin 27c of the first lift member 27 is engaged with the terminal end of the driving portion 29b of the first cam groove 29 (refer to FIG. 17).

The driving motor is continuously rotated to rotate the cam member 28, and the engaging projection 34a of the second lift member 33 is moved in the terminal end portion 30d of the second cam groove 30 and the second lift member 33 is moved downwardly. Meanwhile, since the engagement pin 27c of the first lift member 27 is moved in the locking portion 29c of the first cam groove 29, the first lift member 27 is not moved and the base unit 14 not moved in the forward or backward direction.

Figure 19:
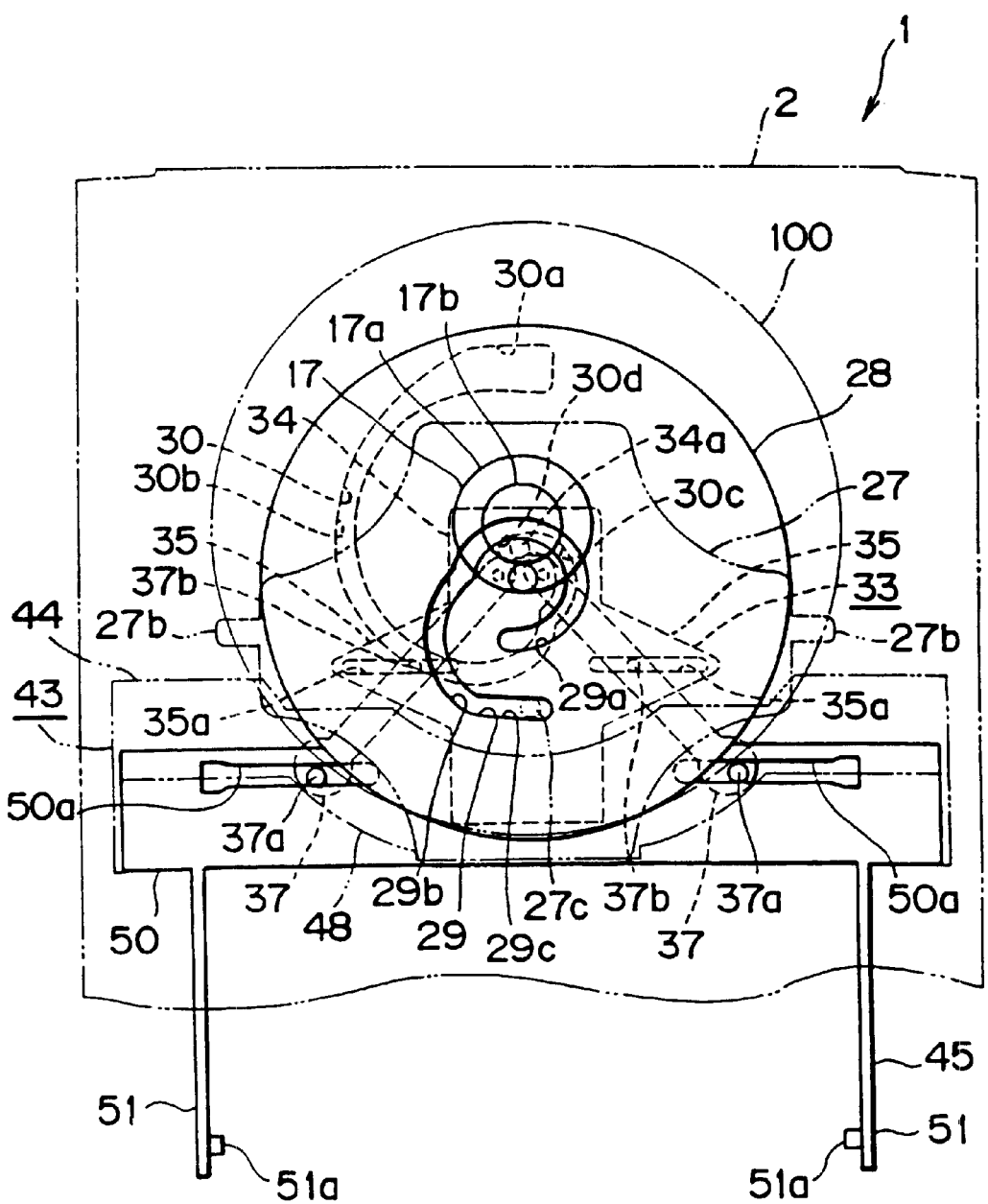
FIG. 19 is a schematic front elevational view illustrating a state wherein the holder is lowered to a position in which it is retracted from the CD.

When the engaging projection 34a is moved in the terminal end portion 30d and the second lift member 33 is moved downwardly, the holder 43 is moved downwardly again. At this time, since the CD 100 is chucked by the disk clamper 9 and the disk table 17, the holder 43 is retracted downwardly from the CD 100 by the downward movement of the holder 43 (refer to FIG. 19). Accordingly, the CD 100 is put into a state wherein it can rotate without interfering with the holder 43.

When the cam member 28 is rotated and the engaging projection 34a is moved in the terminal end portion 30d until a predetermined position is reached, the operation switch 26 is operated to the third detection position by the operation portion 31c of the operation member 31, whereupon a stopping signal is signaled to the driving motor and the rotation of the driving motor is stopped.

If the operation button 7 for reproduction of the front panel 6 is pressed, then the spindle motor is rotated to rotate the disk table 17 so that the chucked CD 100 is rotated while the optical pickup 19 is driven to perform a reproduction operation for the CD 100.

If the operation button 7 for reproduction stopping of the front panel 6 is pressed, then the rotation of the CD 100 is stopped and the driving of the optical pickup 19 is stopped, thereby ending the reproduction operation for the CD 100.

An ejection operation for the CD 100 is performed by the driving motor which is rotated in the reverse direction to that described above. If the operation button 7 for ejection provided on the front panel 6 is pressed, then the driving motor is rotated and ejection of the CD 100 is performed.

When the driving motor is rotated in the reverse direction, the engaging projection 34a of the second lift member 33 is moved from the terminal end portion 30d of the second cam groove 30 toward the non-operating portion 30c (refer to FIG. 17), and the second lift member 33 and the holder 43 are moved upwardly to establish a state wherein holding of the chucked CD 100 by the holder 34 is possible (refer to FIG. 18).

Figure 16:
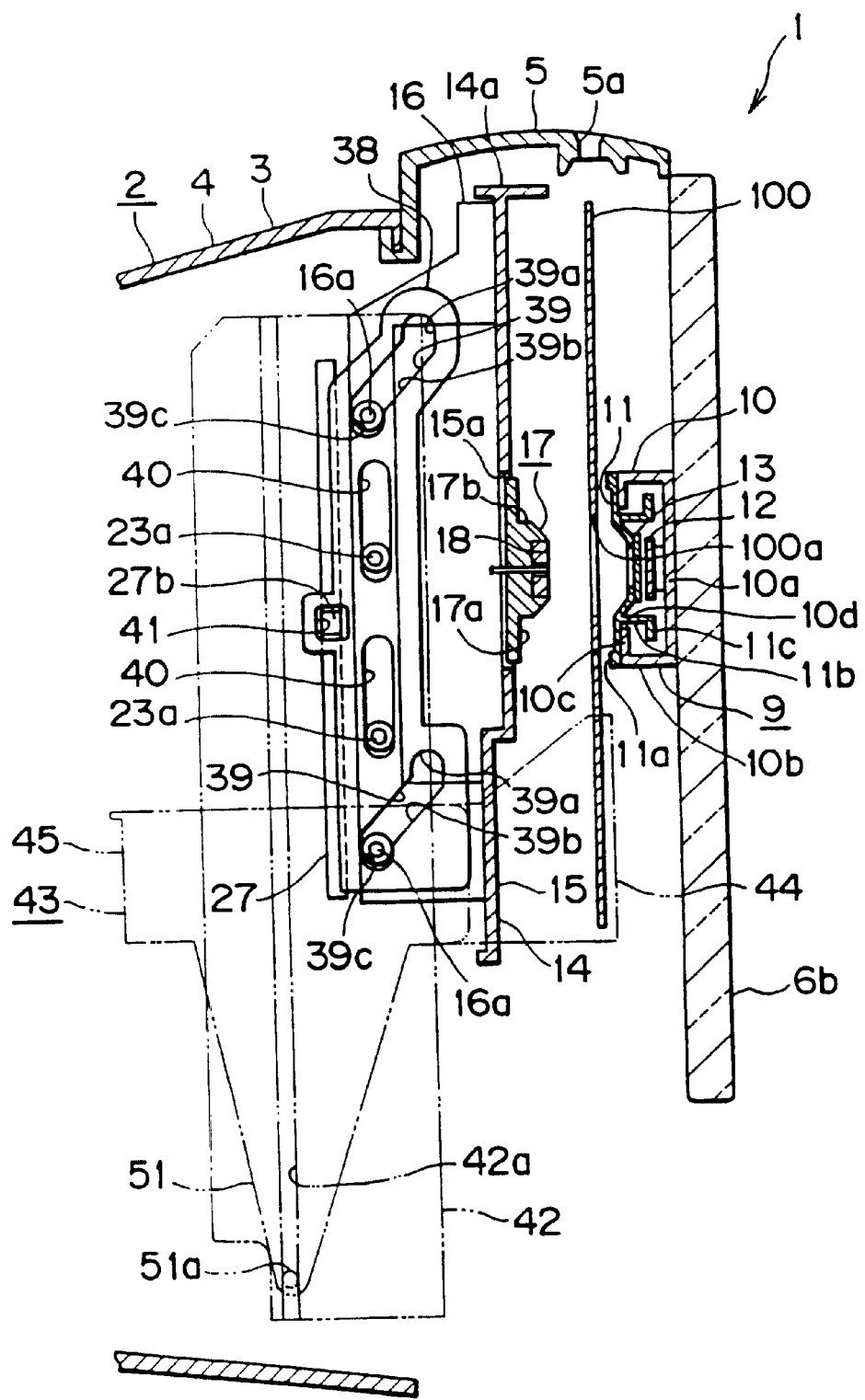
FIG. 16 is a schematic side elevational view illustrating, partly in section, the state wherein the CD is positioned between the disk table and the disk clamper.

Further, when the cam member 28 is rotated, the engagement pin 27c of the first lift member 27 is moved within the driving portion 29b of the first cam groove 29 toward the non-driving portion 29a and the base unit 14 is moved rearwardly (refer to FIG. 16). Then, by the rearward movement of the base unit 14, the attraction of the stabilizer 11 to the iron plate 13 by the magnet 18 of the disk table 17 is cancelled and the iron plate 13 is attracted to the sub magnet 12 of the body side support section 10 to cancel the chucking of the CD 100.

As the base unit 14 is moved rearwardly, the insertion slot 5a of the top panel 5 which has been closed with the upper face portion 14a is opened thereby to establish a state wherein discharging of the CD 100 from the insertion slot 5a is possible (refer to FIG. 16).

Further, when the cam member 28 is rotated, the engaging projection 34a of the second lift member 33 is moved within the operating portion 30b of the second cam groove 30 toward the starting end portion 30a, and the second lift member 33 and the holder 43 are moved upwardly again. Then, by the upward movement of the base portion 34, the CD 100 is discharged from the insertion slot 5a (refer to FIG. 14). When the engaging projection 34a of the second lift member 33 reaches the predetermined position of the starting end portion 30a, the operation switch 26 is operated to the second detection position by the operation portion 31c of the operation member 31, and a stopping signal is signaled to the driving motor to stop the rotation of the driving motor, thereby to end the ejection operation.

In the disk playback apparatus 1, if the operation button 7 for loading provided on the front panel 6 is pressed, then the driving motor is rotated and loading of the held CD 100 is performed. Loading can be performed by pressing down the CD 100 placed in the holding grooves 48a, 48a of the holder 43 inserted in the insertion slot 5a.

If, in the initial state described above, that is, in a state before a loading operation for the CD 100 is performed, the CD 100 is inserted into the insertion slot 5a and the CD 100 placed in the holding grooves 48a, 48a of the holder 43 is pressed downwardly, then the second lift member 33 is moved downwardly a little through the holder 43 and the pivotal members 37, 37. When the second lift member 33 is moved downwardly a little, the engaging projection 34a which is in contact with the pressed portion 31a of the operation member 31 at the starting end portion 30a of the second cam groove 30 presses the pressed portion 31a downwardly a little (refer to FIG. 8). Then, the operation member 31 is moved downwardly a little with respect to the cam member 28, and the operation of the operation switch 26 to the second detection position by the operation portion 31c is cancelled, and the operation switch 26 comes to the first detection position (refer to FIG. 8).

When the operation switch 26 is operated to the first detection position, a driving signal is signaled to the driving motor to rotate the driving motor, and the loading operation described above is performed.

Then, when the pressing against the CD 100 is cancelled, the operation member 31 is moved upwardly by the biasing force of the tension coil spring 32 extending between the cam member 28 and the operation member 31, whereupon the pressed portion 31a is engaged with the control portion 28g of the cam member 28 to restrict the upward movement of the operation member 31.

Accordingly, since the operation member 31 is returned with certainty to a position at which the pressed portion 31a thereof can be pressed by the engaging projection 34a of the second lift member 33, a loading operation by the pressing of the CD 100 can always be started optimally and with certainty.

As described above, in the disk playback apparatus 1, upon pressing of the CD 100, a wall portion which forms the second cam groove 30 of the cam member 28 is not pressed by the engaging projection 34a, but a loading operation is started automatically by pressing the operation member 31 which is moved in the direction in which the CD 100 is pressed.

Accordingly, a loading operation can be performed with the CD 100 pressed with weak force by the user, and the convenience in use of the disk playback apparatus 1 can be anticipated. Further, the CD 100 or any member of the disk playback apparatus 1 such as the holder 43 is not damaged at all by pressing the CD 100.

Further, since the operation member 31 is supported for movement on the cam member 28, the arrangement space for the operation member 31 may be small, and miniaturization of the disk playback apparatus 1 can be anticipated as much.

Furthermore, in the disk playback apparatus 1, since a loading operation for the CD 100 and a chucking operation for the CD 100 are performed successively as the cam member 28 rotates as described above, separate members or mechanisms for performing the operations are not required, and reduction of the number of parts and simplification of the mechanism can be achieved as much.

Subsequently, opening and closing operations for the insertion slot 5a by the shutter, that is, the upper face portion 14a of the base unit 14 after lapse of the predetermined time are described.

In the disk playback apparatus 1, when the insertion slot 5a is open, it is automatically closed with the upper face portion 14a of the base unit 14 after lapse of a predetermined time.

Figure 20:
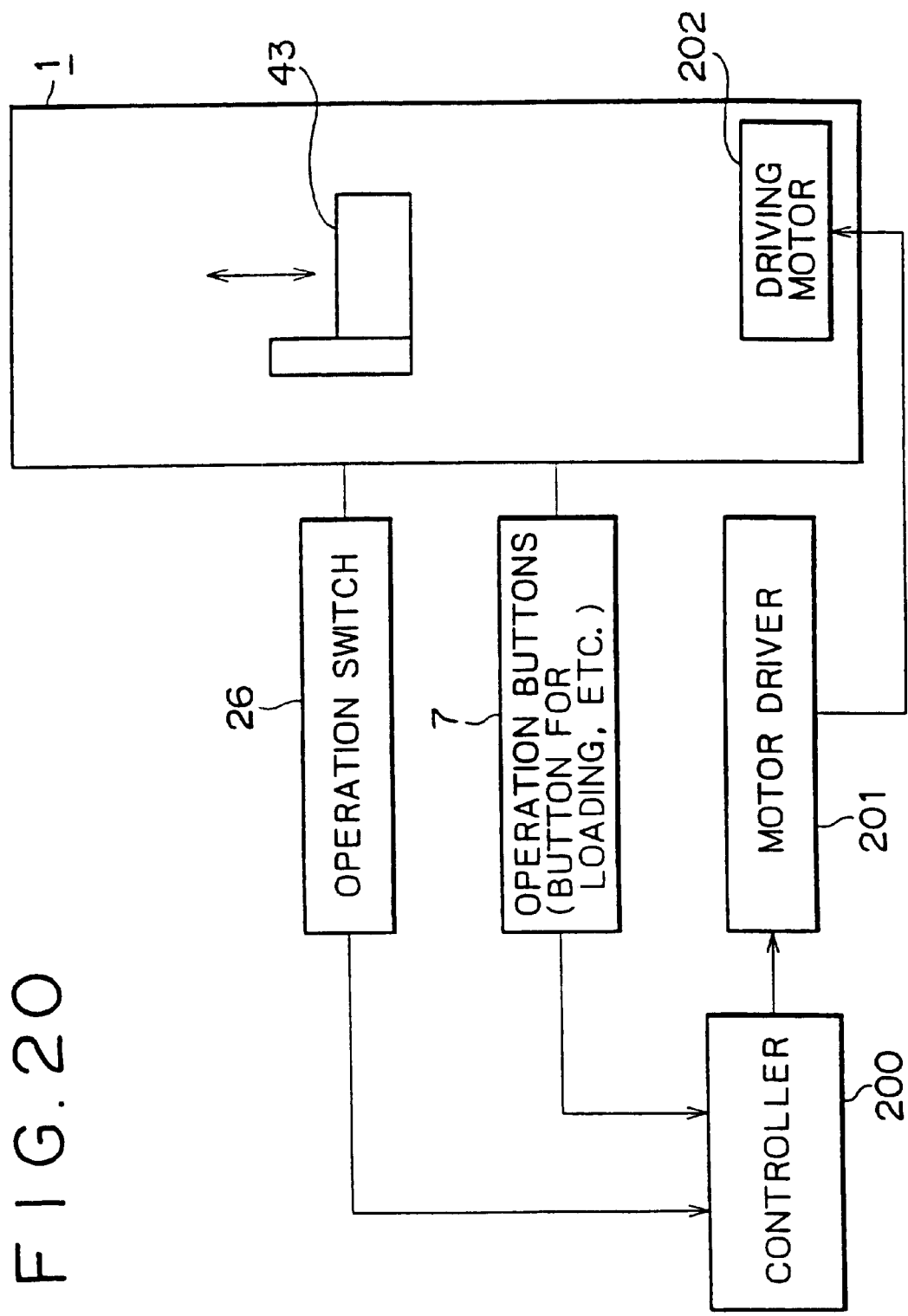
FIG. 20 is a block diagram showing a circuit construction for automatically closing an insertion slot after lapse of a predetermined time.

FIG. 20 is a block diagram showing a circuit construction for automatically closing the insertion slot 5a after lapse of a predetermined time.

The holder 43 of the disk playback apparatus 1 is moved up or down as a driving motor 202 is rotated through a motor driver 201 in response to an instruction from a controller 200. The controller 200 signals various signals in response to operations of the operation buttons 7, 7, . . . and the operation switch 26.

Figure 21:
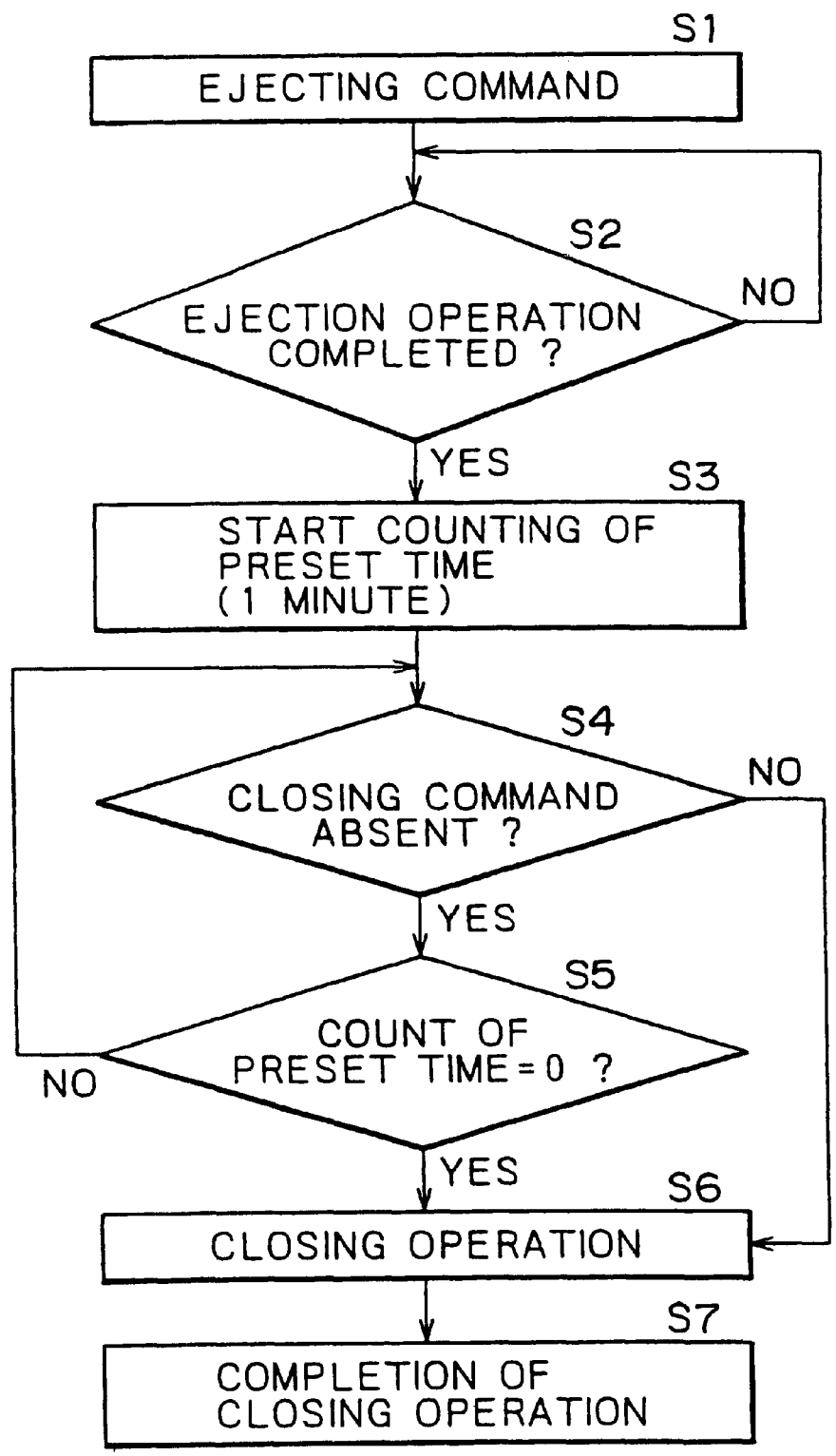
FIG. 21 is a flow chart illustrating operation for automatically closing the insertion slot after lapse of the predetermined time.

FIG. 21 is a flow chart illustrating operation for automatically closing the insertion slot 5a after lapse of a predetermined time. It is to be noted that, in the flow chart, a state that the insertion slot 5a is closed is used as a start point of time.

Step S1: If the operation button 7 for ejection is operated, then an ejecting command is provided from the controller 200 to the driving motor 202 through the motor driver 201. Consequently, the driving motor 202 is rotated to move the holder 43 upwardly to effect an ejection operation.

Step S2: In a state wherein the ejection operation is completed, since the base unit 14 is positioned at the movement end on the rear side, the insertion slot 5a is open and a state that the CD 100 can be inserted is established.

Step S3: When the operation switch 26 is operated to the second detection position and the rotation of the driving motor 202 is stopped to complete the ejection operation, counting of a preset time by the controller 200 is started. This preset time is set, for example, to 1 minute.

Step S4: If a closing command for the insertion slot 5a is not issued within the preset time, then counting of the preset time is continued. If a closing command is issued, then a closing operation of step S6, that is, an operation of closing the insertion slot 5a with the upper face portion 14a of the base unit 14 is performed. This closing command is issued from the controller 200 when the operation button 7 for loading is operated, for example, by a user, and such a loading operation as described above is started in response to the closing command.

Step S5: If the counting of the preset time by the controller 200 comes to 0, then a closing operation is performed. If the count value of the preset time is not 0, then the detection of whether or not a closing command is issued and the counting of the preset time are performed continuously.

Step S6: A closing operation is performed. In particular, an operation signal is signaled from the controller 200, and the driving motor 202 is rotated to move the holder 43 downwardly. Further, the base unit 14 is moved from the movement end on the rear side to the movement end of the front side and the insertion slot 5a is closed by the upper face portion 14a.

Step S7: By rotation of the cam member 28, the operation switch 26 is operated to the third detection position by the operation portion 31c of the operation member 31, and the rotation of the driving motor 202 is stopped, thereby completing the closing operation.

It is to be noted that, in the disk playback apparatus 1, the insertion slot 5a is closed after lapse of the predetermined time irrespective of the insertion of a CD 100 in the insertion slot 5a. Accordingly, if a CD 100 is inserted into the insertion slot 5a, then downward movement of the holder 43 and forward movement of the base unit 14 are performed to perform a loading operation of the CD 100 and close the insertion slot 5a after lapse of the predetermined time. However, if a CD 100 is not inserted into the insertion slot 5a, then downward movement of the holder 43 and forward movement of the base unit 14 are performed to close the insertion slot 5a after lapse of the predetermined time.

In this manner, in the disk playback apparatus 1, since the insertion slot 5a is closed after lapse of the predetermined time, admission of dust and so forth through the insertion slot 5a and sticking of dust and so forth to the CD 100 can be minimized, and maintenance of the performance of the disk playback apparatus 1 can be anticipated.

Further, since part of the base unit 14 is used as a shutter for opening and closing the insertion slot 5a, a separate shutter is not required, and the number of parts of the disk playback apparatus 1 is reduced and reduction of the production cost of the disk playback apparatus 1 can be anticipated.

Furthermore, since the insertion slot 5a is closed when the base unit 14 is moved upon chucking operation for the CD 100 and the insertion slot 5a is opened when the base unit 14 is moved upon cancellation of chucking of the CD 100, the insertion slot 5a is opened and closed in accordance with the necessity, and the convenience in use of the disk playback apparatus 1 can be achieved and admission of dust and so forth through the insertion slot 5a can be prevented efficiently.

Subsequently, a disk adapter 300 is described. The disk adapter 300 receives a disk-type recording medium having a diameter smaller than that of the CD 100, for example, a CD 400 of a small diameter of 8 cm and is used with the disk playback apparatus 1.

Figure 22:
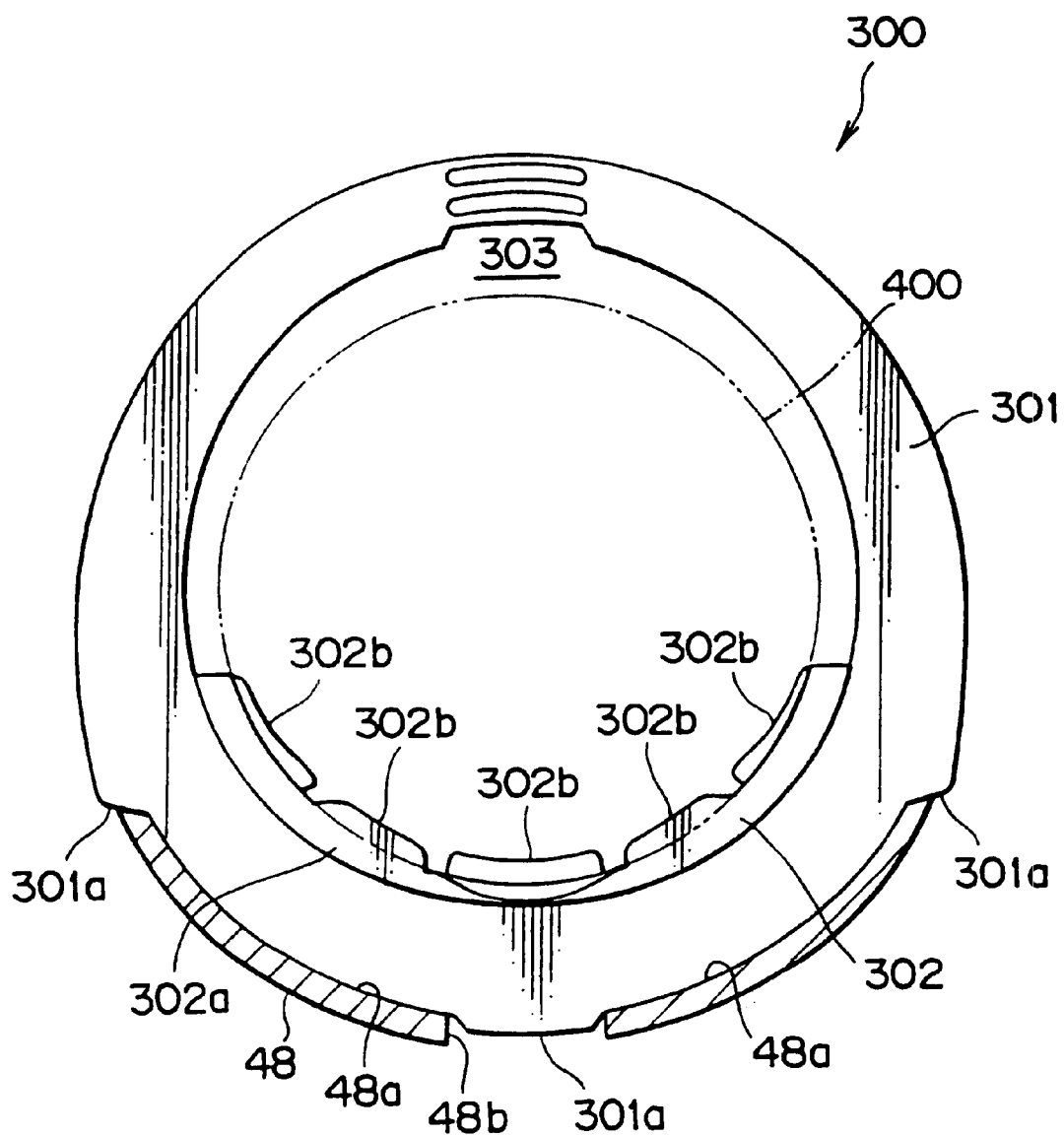
FIG. 22 is a front elevational view of a disk adapter.
Figure 23:
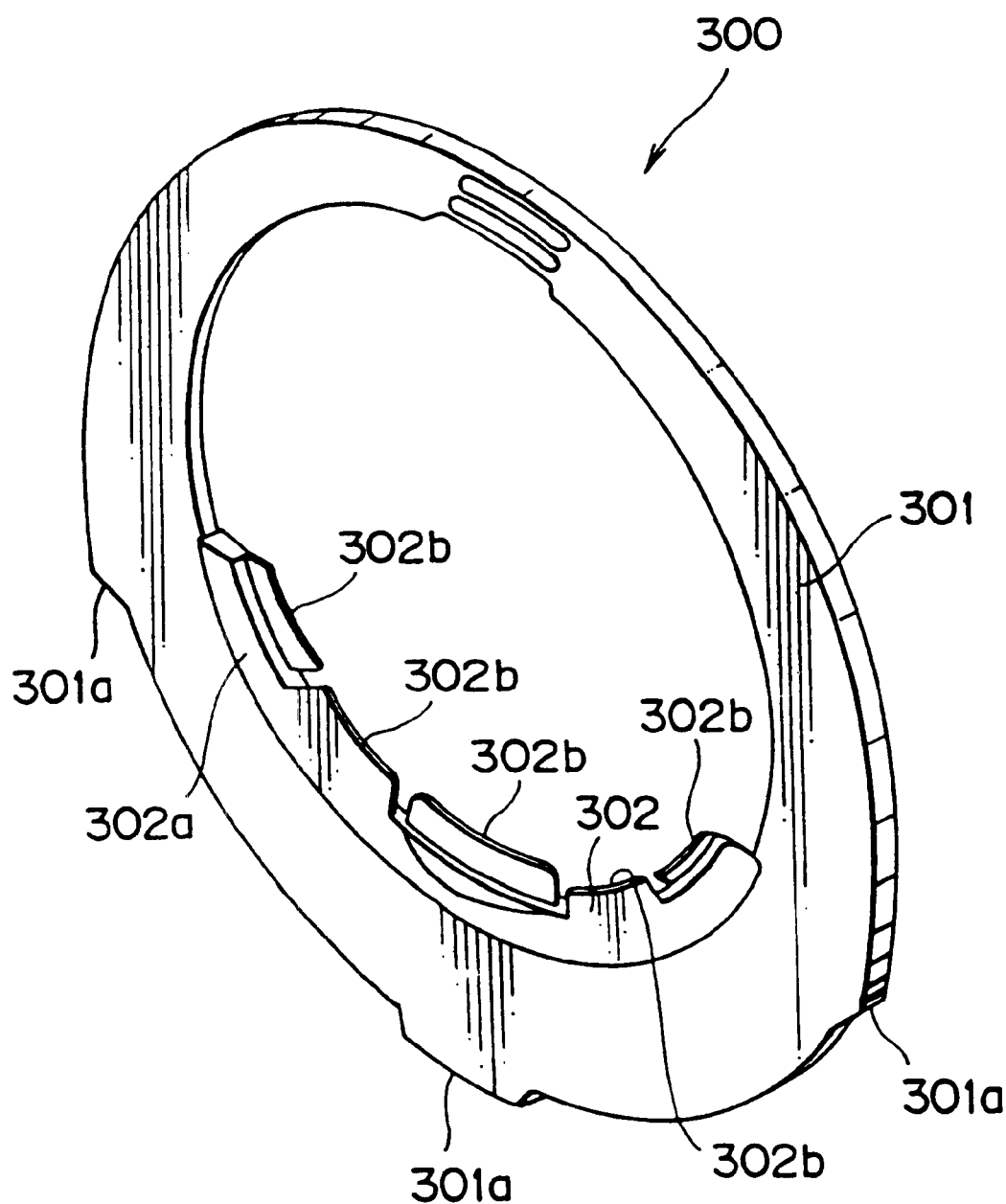
FIG. 23 is a perspective view of the disk adapter.

The disk adapter 300 includes a main plate member 301 and a letting-off prevention member 302 formed as a unitary member, for example, from a transparent resin material (refer to FIGS. 22 and 23).

The main plate member 301 is in the form of a plate having a substantially annular shape, and the letting-off prevention member 302 is formed on one half circumference side of an inner peripheral edge of the main plate member 301. Positioning projections 301a, 301a, 301a are formed in a circumferentially equally spaced relationship from each other on one half circumference side of an outer peripheral edge of the main plate member 301.

The letting-off prevention member 302 is composed of a base portion 302a contiguous to the inner circumferential edge of the main plate member 301, and supporting pieces 302b, 302b, . . . extending inwardly from the base portion 302a. The letting-off prevention member 302 is formed such that it extends in a circumferential direction and is formed with a thickness a little greater than that of the main plate member 301.

The five supporting pieces 302b, 302b, . . . are formed in a circumferentially spaced relationship from each other and extend alternately from the opposite end portions of the base portion 302a in the thicknesswise direction. The supporting piece 302b which is positioned centrally is positioned corresponding to the positioning projection 301a which is positioned centrally. The supporting pieces 302b, 302b, . . . are formed such that the distance between adjacent ones of the supporting pieces 302b, 302b in the thicknesswise direction is a little greater than the thickness of the CD 400.

The CD 400 is mounted and supported on the disk adapter 300 such that an outer peripheral edge thereof is held from the opposite sides in the thicknesswise direction by the supporting pieces 302b, 302b, . . . In the state wherein the CD 400 is supported in this manner, a space of a fixed magnitude is formed between the inner peripheral edge of the main plate member 301 opposite to the side on which the letting-off prevention member 302 is formed and an outer peripheral edge of the CD 400, and this space functions as a finger insertion space 303 (refer to FIG. 22).

Since the finger insertion space 303 is formed in this manner, it is possible for the user to insert a finger into the finger insertion space 303 to perform mounting and removal of the CD 400 onto and from the disk adapter 300 easily.

Further, in the disk adapter 300, since the supporting pieces 302b, 302b, . . . which support the CD 400 from the opposite sides in the thicknesswise direction are formed on the inner peripheral edge of the main plate member 301, mounting and removal of the CD 400 can be performed by inserting the CD 400 between the supporting pieces 302b, 302b, . . . or taking out the CD 400 from between the supporting pieces 302b, 302b, . . . , and mounting and removing operations of the CD 400 onto and from the disk adapter 300 are very simple.

Further, since the supporting pieces 302b, 302b, have a simple construction, reduction of the production cost of the disk adapter 300 can be achieved.

The disk adapter 300 with the CD 400 supported thereon is inserted into the insertion slot 5a of the disk playback apparatus 1 in such a manner that the positioning projection 301a which is positioned centrally may be positioned at the bottom. Then, the disk adapter 300 inserted in the insertion slot 5a is positioned with respect to the holder 43 such that the positioning projection 301a which is positioned centrally is positioned within the recess 48b of the holding portion 48 of the holder 43 and the positioning projections 301a, 301a positioned on the opposite sides are placed at the opposite left and right end portions of the upper edge of the holding portion 48 (refer to FIG. 22).

In this state, a loading operation is performed in a similar manner to the CD 100 described hereinabove. Then, in a state that chucking for the CD 400 is completed, similarly as described above, the engaging projection 34*a* of the second lift member 33 is engaged with the terminal end of the non-operating portion 30*c* of the second cam groove 30. Consequently, when the driving motor is rotated continuously, the engaging projection 34*a* is moved within the terminal end portion 30*d* to move the second lift member 33 downwardly thereby to move the holder 43 downwardly. At this time, since the CD 400 is held chucked by the disk damper 9 and the disk table 17, by the downward movement of the holder 43, the disk adapter 300 placed in the holding grooves 48*a*, 48*a* is retracted downwardly from the CD 400 and comes to the non-interfering position at which it does not interfere with the CD 400. Accordingly, the CD 400 is rotated without interference with the disk adapter 300 to perform a reproduction operation.

In this manner, in the disk adapter 300, since the CD 400 is moved to the non-interfering position at which it does not interfere with the disk adapter 300, the CD 400 is rotated in a state wherein mounting on the disk adapter 300 is cancelled. Accordingly, when compared with another case wherein a CD is rotated integrally in a state wherein it is mounted on a disk adapter, occurrence of lateral movements of the CD out of a plane of rotation can be prevented, and augmentation of the reading performance of a signal recorded on the CD 400 by the optical pickup 19 can be anticipated.

As described above, in the disk adapter 300, since the letting-off prevention member 302 is provided on the half circumference side of the main plate member 301, there is no necessity to engage a plurality of holding pieces provided on an inner circumference with an outer peripheral edge of a CD and canceling such engagement to perform mounting and removing operations as in a conventional disk adapter, and little time is required for mounting and removing operations of the CD 400 onto and from the disk adapter 300 and augmentation of the workability can be anticipated.

Further, where the disk adapter 300 is used with the disk playback apparatus 1 of the vertical loading type, in order to mount or remove the CD 400 onto or from the disk adapter 300, it is only required to slidably move the CD 400 in the downward or upward direction with respect to the disk adapter 300. Further, in order to insert or remove the disk adapter 300 into or from the insertion slot 5*a*, it is only required to grasp the disk adapter 300 on which the CD 400 is mounted and move it upwardly or downwardly. Consequently, augmentation of the convenience in use can be achieved.

Figure 24:
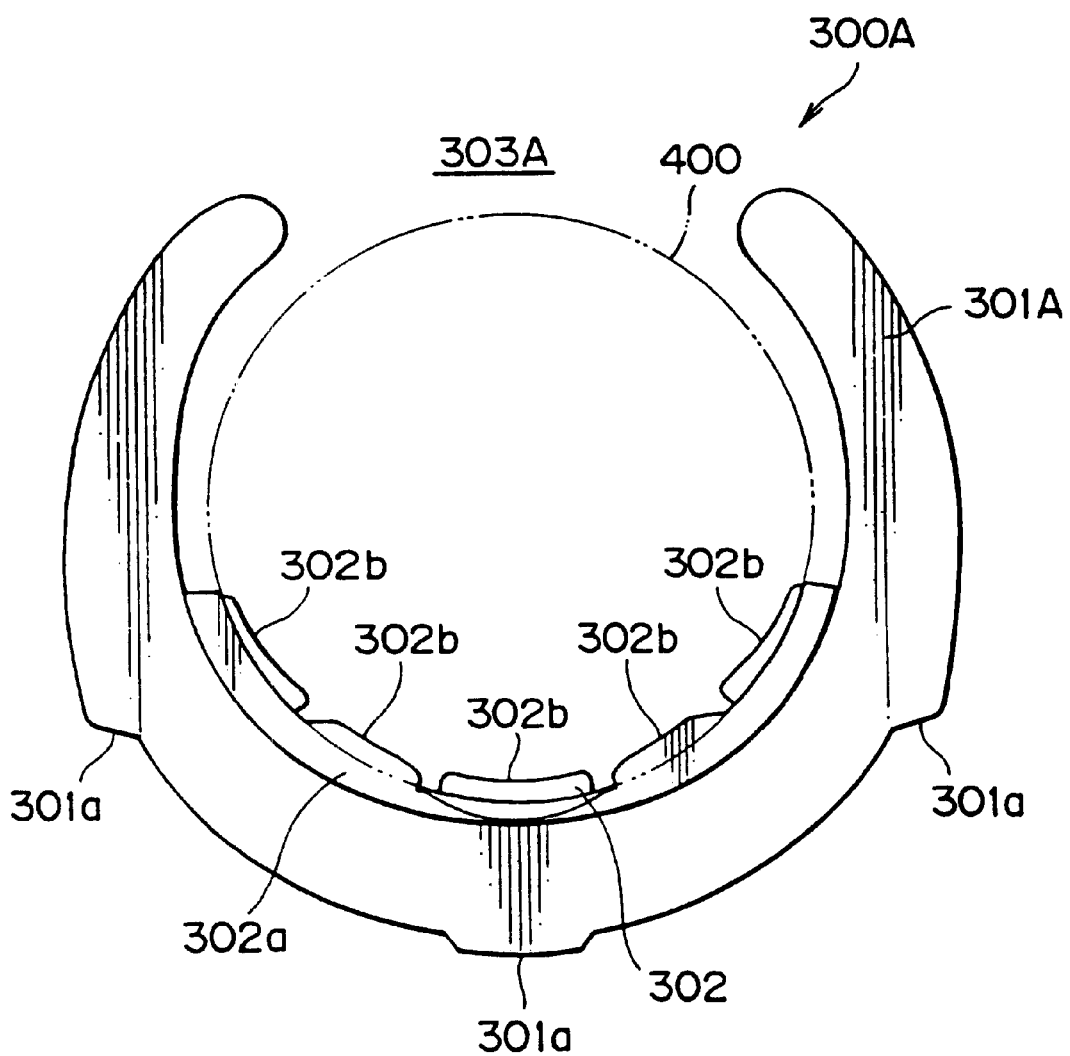
FIG. 24 is a front elevational view showing a modification to the disk adapter.

FIG. 24 shows a modification to the disk adapter 300. The disk adapter 300A includes a main plate portion 301A which is formed substantially in an arcuate shape whose central angle is that of above 180 degrees. Further, a gap is formed between end edges of the main plate portion 301A in a circumferential direction, and the gap functions as a finger insertion space 303A.

In the present disk adapter 300A, since the finger insertion space 303A is formed as a large space, mounting and removal of the CD 400 are further facilitated.

It is to be noted that the particular shapes and structures of the elements described above in connection with the embodiment are a mere example of embodiment upon carrying out the present invention, and the technical scope of the present invention shall not be interpreted restrictively thereby.

As apparent from the foregoing description, a disk adapter according to the embodiment of the present invention which is used with a disk-type recording medium mounted on an inner circumference side thereof is characterized in that it comprises a main plate portion having a substantially arcuate shape of a central angle of 180° or more or a substantially annular shape, and a letting-off prevention portion formed on an inner circumferential edge of a half circumference side of the main plate portion for supporting the disk-type recording medium and preventing letting off of the disk-type recording medium.

Accordingly, such mounting and removing operations for engaging a plurality of holding pieces provided on an inner circumference with an outer circumferential edge of the disk-type recording medium and cancelling the engagement as in the conventional disk adapter need not be performed. Thus, the mounting and removing operations of the disk-type recording medium onto and from the disk adapter requires little time and augmentation of the operability can be anticipated.

In the disk adapter according to the embodiment of the present invention, when the disk-type recording medium mounted on a disk table is rotated, the disk adapter is retracted to a non-interfering position in which the disk adapter does not interfere with the disk-type recording medium. Consequently, when compared with another case wherein the disk-type recording medium is mounted on the disk adapter and rotated integrally with the disk adapter, occurrence of lateral movements of the disk-type recording medium out of a plane of rotation can be prevented, and optimization of recording and reading operations of an information signal onto and from the disk-type recording medium can be anticipated.

In the disk adapter according to the embodiment of the present invention, when the disk-type recording medium is supported on the letting-off prevention portion, a finger insertion space for allowing the disk-type recording medium to be gripped is formed on the outer side of an outer circumferential edge in a radial direction of the disk-type recording medium. Consequently, mounting and removal of a disk-type recording medium onto and from the disk adapter can be performed readily by inserting fingers into the finger insertion space.

In the disk adapter according to the embodiment of the present invention, the disk adapter is used with a disk recording and/or playback apparatus of an installed type wherein recording and/or reproduction of an information signal is performed for the disk-type recording medium which is moved and carried in orientation in which a main face thereof is directed in a substantially horizontal direction. Consequently, in mounting and removing operations of a disk-type recording medium onto and from the disk adapter, it is only required to slidably move the disk-type recording medium in the upward and downward directions with respect to the disk adapter. Further, in order to insert and remove the disk adapter having a disk-type recording medium mounted thereon into and from the disk recording and/or playback apparatus, it is only required to grip and upwardly and downwardly move the disk adapter. Consequently, augmentation in convenience in use can be anticipated.

In the disk adapter according to the embodiment of the present invention, a plurality of supporting pieces extending in a circumferential direction of the main plate portion for supporting the disk-type recording medium in such a manner as to hold a main face of the disk-type recording medium from the opposite sides therebetween are formed as the letting-off prevention portion. Consequently, mounting and removing operations of a disk-type recording medium onto and from the disk adapter are very simple.

Further, since the supporting pieces are simple in construction, reduction of the production cost of the disk adapter can be anticipated.

What is claimed is:

1. A recording and/or playback apparatus, comprising:

carrying means for carrying a disk adapter for receiving a disk-type recording medium on an inner circumference side thereof from an insertion position to a chucking position and an away position;

mounting means for mounting the disk-type recording medium carried to the chucking position; and control means for controlling said carrying means so that, after the disk-type recording medium is mounted on said mounting means, said carrying means carries said disk adapter to the away position spaced away from the disk-type recording medium mounted on the mounting means.

2. A recording and/or playback apparatus according to claim 1, wherein said carrying means further has a recessed portion formed thereon, and a positioning projection formed on an outer circumference side of said disk adapter is engaged with said recessed portion to position said disk adapter to be carried.

3. A recording and/or playback apparatus according to claim 1, wherein said carrying means carries the disk-type recording medium such that a main face of the disk-type recording medium lies in a plane substantially in parallel to a vertical direction.

4. A disk adapter according to claim 1, wherein:

the mounting means comprises a disk table; and the away position is a non-interfering position in which the disk adapter does not interfere with the disk table and the disk-type recording medium being rotated.

5. A disk adapter according to claim 1, wherein:

the mounting means comprises a disk table;

the carrying means comprises a holder;

at the chucking position, the disk-type recording medium is mounted onto the disk table; and said disk adapter is retracted together with said holder to the away position which is a non-interfering position in which said disk adapter does not interfere with said disk table and the disk-type recording medium being rotated.

6. A recording and/or playback apparatus, comprising:

a mounting device configured to mount a disk-type recording medium carried to a chucking position;

a carrying device configured to carry a disk adapter from an insertion position to the chucking position and an away position, the disk adapter being configured to receive the disk-type recording medium on an inner circumference side thereof; and a controller configured to control the carrying device such that after the disk-type recording medium is mounted on the mounting device, the carrying device carries the disk adapter to the away position such that the disk adapter is moved away from the disk-type recording medium on the mounting device.

7. A recording and/or playback apparatus according to claim 6, wherein said carrying device has at least one recessed portion configured to engage with a positioning projection formed on an outer circumference side of the disk adapter.

8. A recording and/or playback apparatus according to claim 6, wherein the carrying device carries the disk-type recording medium such that a main face of the disk-type recording medium lies in a plane substantially in parallel to a vertical direction.

9. A disk adapter according to claim 6, wherein:

the mounting device comprises a disk table; and the away position is a non-interfering position in which the disk adapter does not interfere with the disk table and the disk-type recording medium being rotated.

10. A disk adapter according to claim 6, wherein:

the mounting device comprises a disk table;

the carrying device comprises a holder;

at the chucking position, the disk-type recording medium is mounted onto the disk table; and said disk adapter is retracted together with said holder to the away position which is a non-interfering position in which said disk adapter does not interfere with said disk table and the disk-type recording medium being rotated.

* * * * *

UNITED STATES PATENT AND TRADEMARK OFFICE
CERTIFICATE OF CORRECTION

PATENT NO. : 6,574,179 B2
DATED : June 3, 2003
INVENTOR(S) : Takayuki Kaneko et al.

It is certified that error appears in the above-identified patent and that said Letters Patent is hereby corrected as shown below:

Column 3,
Lines 26, 31 and 60, change "damper" to -- clamper --.

Column 4,
Lines 8-12, delete lines 8-12.
Line 29, change "damper" to -- clamper --.

Column 9,
Lines 27 and 41, change "damper" to -- clamper --.

Column 10,
Line 66, change "damper" to -- clamper --.

Column 11,
Lines 41, 49 and 50, change "damper" to -- clamper --.

Column 17,
Line 10, change "damper" to -- clamper --.

Signed and Sealed this

Eighteenth Day of May, 2004

JON W. DUDAS
*Acting Director of the United States Patent and Trademark Office*